(12) United States Patent
Oshima et al.

(10) Patent No.: US 10,564,381 B2
(45) Date of Patent: Feb. 18, 2020

(54) ILLUMINATION DEVICE

(71) Applicant: Mitsubishi Electric Corporation, Tokyo (JP)

(72) Inventors: Ritsuya Oshima, Tokyo (JP); Masashige Suwa, Tokyo (JP); Keiji Nakamura, Tokyo (JP); Muneharu Kuwata, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/314,215

(22) PCT Filed: Jul. 12, 2017

(86) PCT No.: PCT/JP2017/025394
§ 371 (c)(1),
(2) Date: Dec. 28, 2018

(87) PCT Pub. No.: WO2018/012530
PCT Pub. Date: Jan. 18, 2018

(65) Prior Publication Data
US 2019/0204528 A1   Jul. 4, 2019

(30) Foreign Application Priority Data
Jul. 14, 2016   (JP) .................... 2016-139116

(51) Int. Cl.
*G02B 7/02*   (2006.01)
*F21V 17/06*   (2006.01)
(Continued)

(52) U.S. Cl.
CPC ............. *G02B 7/021* (2013.01); *B60Q 1/04* (2013.01); *F21S 41/141* (2018.01); *F21S 41/27* (2018.01);
(Continued)

(58) Field of Classification Search
CPC ....... G02B 7/021; F21V 17/16; F21V 17/162; F21V 17/164; F21V 17/166; F21V 17/168
See application file for complete search history.

(56) References Cited

U.S. PATENT DOCUMENTS 10,241,291 B2 *   3/2019   Kamo ................ G02B 7/021
2012/0218651 A1 *   8/2012   Onishi ................ G02B 7/08
                                                      359/824
(Continued)

FOREIGN PATENT DOCUMENTS

CN   106471309 A   3/2017
JP   11-337794 A   12/1999
(Continued)

OTHER PUBLICATIONS

U.S. Appl. No. 15/315,327, filed Nov. 30, 2016.

*Primary Examiner* — Alan B Cariaso
(74) *Attorney, Agent, or Firm* — Birch, Stewart, Kolasch & Birch, LLP

(57) ABSTRACT

An illumination device including: a light source including a light emitting element that emits light; a first optical element that transmits the light; a second optical element that transmits the light transmitted by the first optical element; a holder that holds the second optical element; and a spring member including at least one spring portion that generates spring force by being deflected, the spring member pressing the second optical element against the holder with the spring force to hold the second optical element against the holder, wherein the first optical element and the second optical element deflect a center portion in a long edge direction of the at least one spring portion with respect to ends in the long edge direction of the at least one spring portion.

20 Claims, 17 Drawing Sheets

(51) Int. Cl.
  *F21V 17/16* (2006.01)
  *F21S 41/27* (2018.01)
  *F21S 41/141* (2018.01)
  *F21S 41/32* (2018.01)
  *B60Q 1/04* (2006.01)
(52) U.S. Cl.
  CPC .............. *F21S 41/32* (2018.01); *F21V 17/06* (2013.01); *F21V 17/162* (2013.01)

(56) References Cited

U.S. PATENT DOCUMENTS

| 2013/0128576 A1* | 5/2013 | Seki ........................ F21V 5/04 362/235 |
| 2017/0198877 A1 | 7/2017 | Suwa et al. |
| 2018/0129066 A1* | 5/2018 | Minamisawa ....... G02B 27/646 |

FOREIGN PATENT DOCUMENTS

| JP | 2003-57031 A | 2/2003 |
| JP | 2005-300859 A | 10/2005 |

* cited by examiner

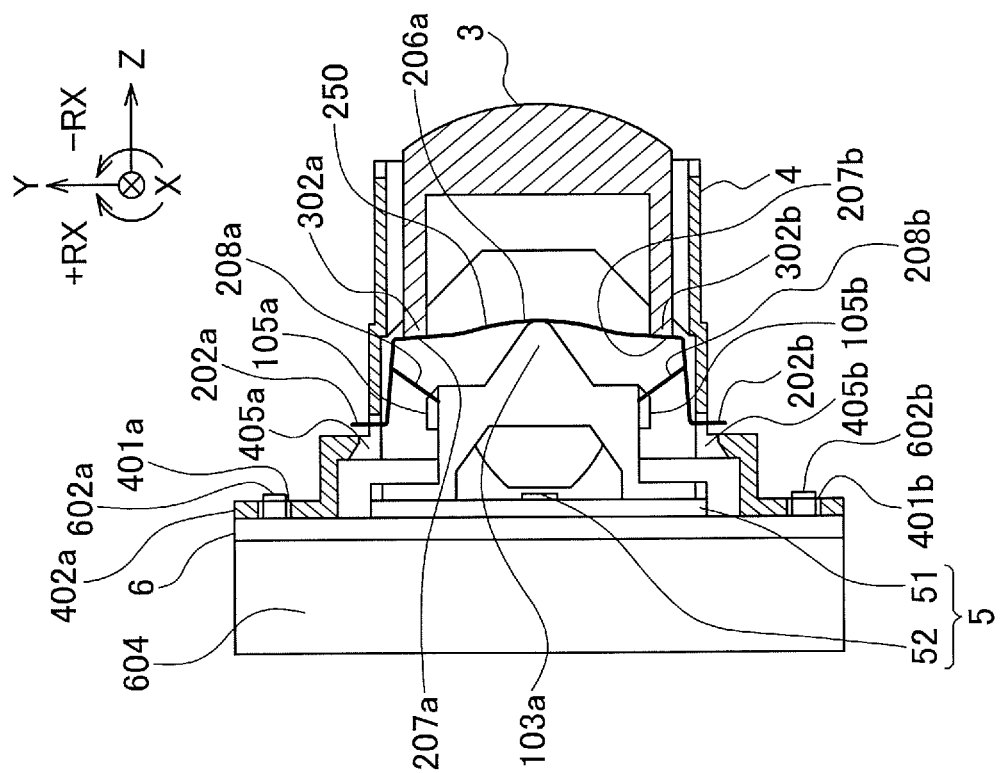
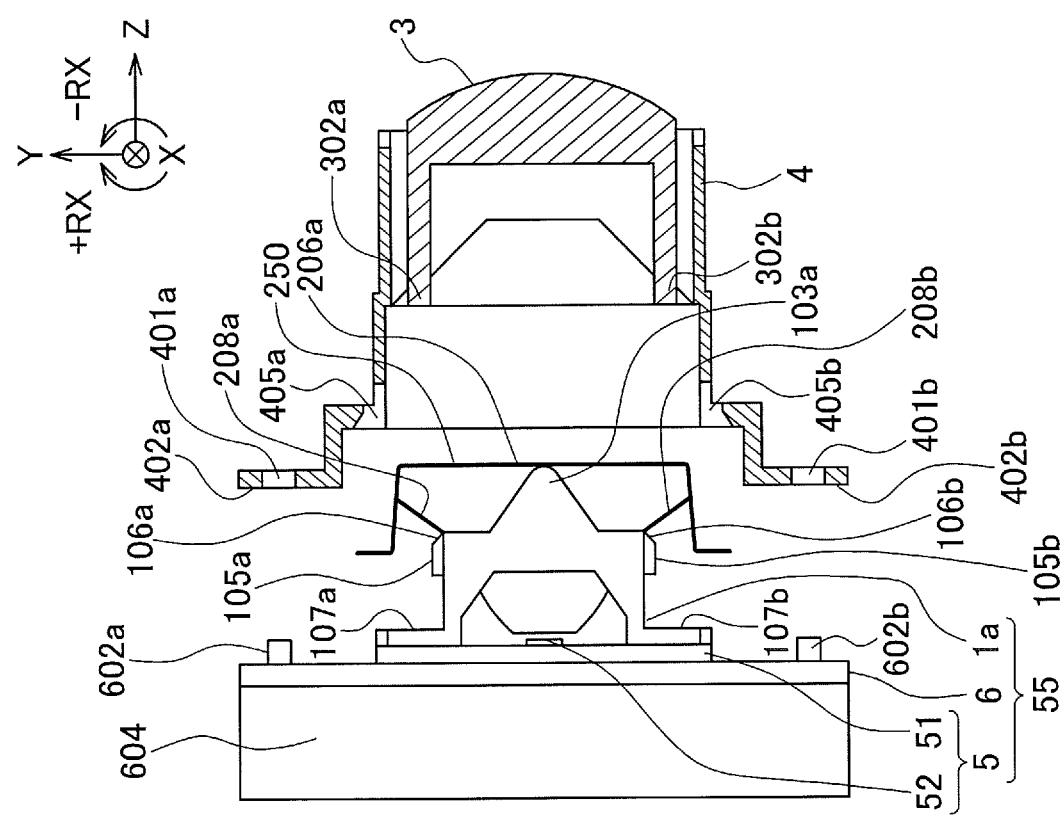

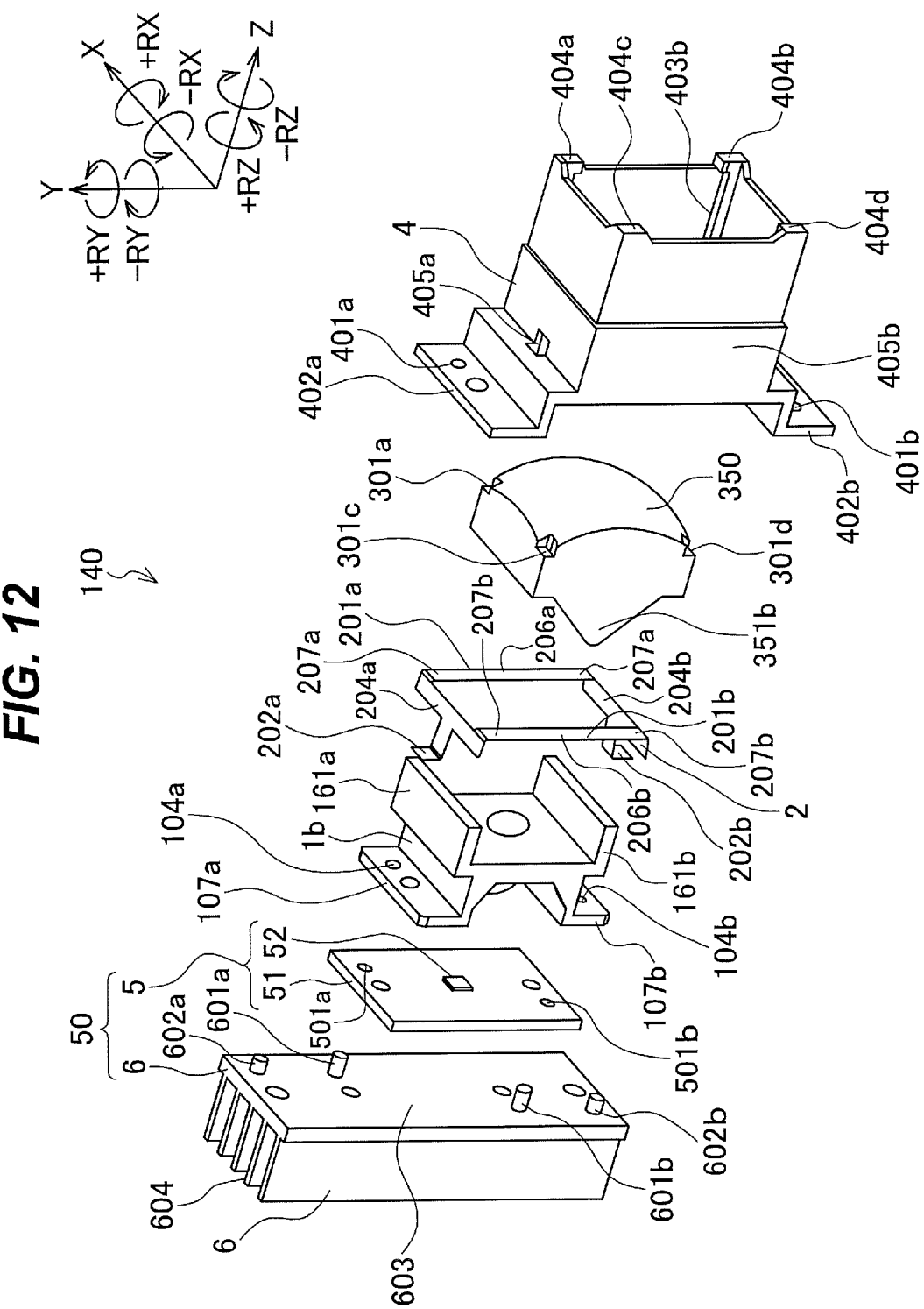

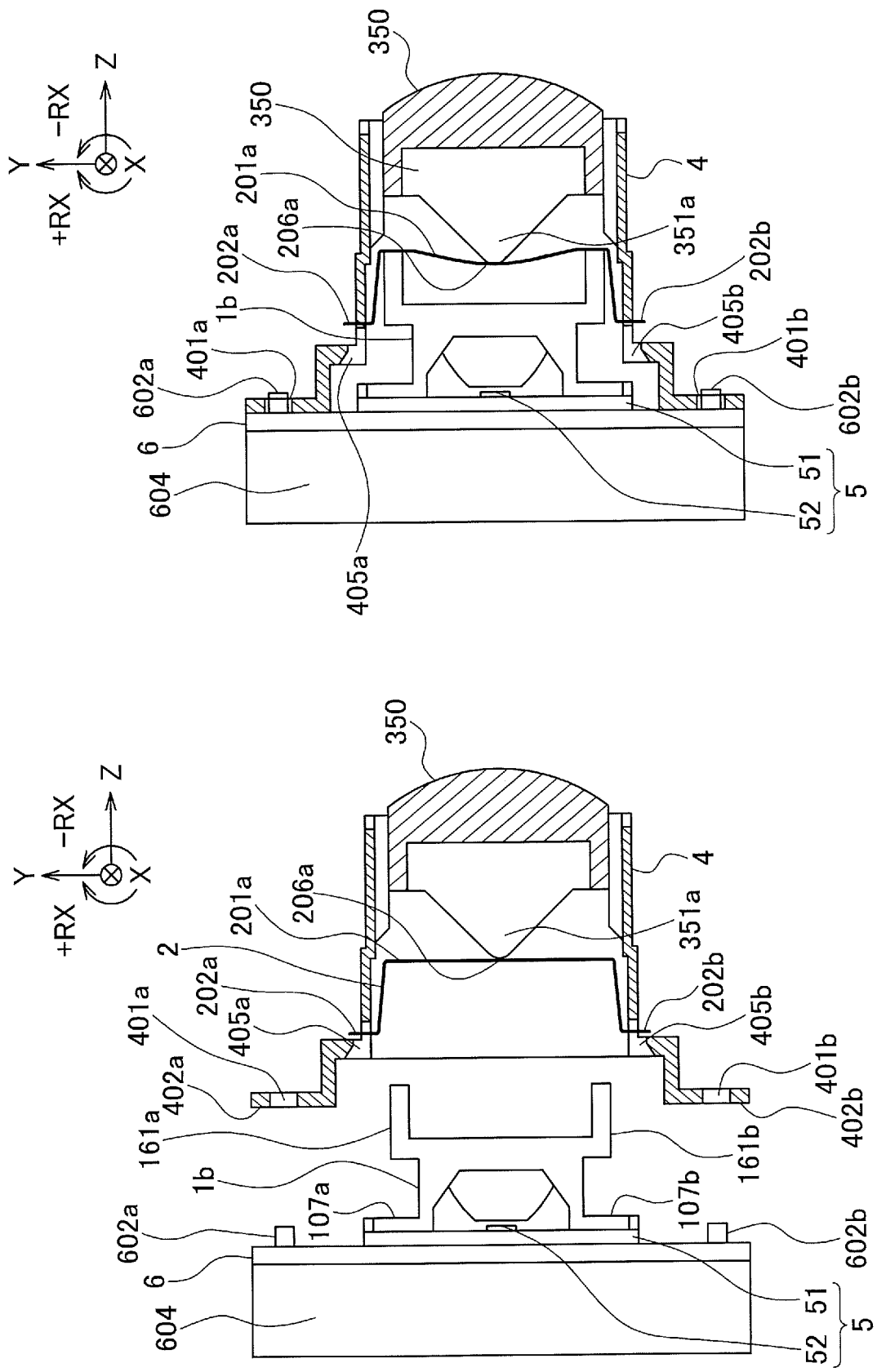

ILLUMINATION DEVICE

TECHNICAL FIELD

The present invention relates to an illumination device.

BACKGROUND ART

From the viewpoint of reducing the burden on the environment, such as reducing emission of carbon dioxide ($CO_2$) and consumption of fuel, it is desired to improve energy efficiency of vehicles. Accordingly, for example, in vehicle headlight devices (referred to below as headlights) or the like, downsizing, weight reduction, and power efficiency improvement are required. "Headlight" refers to an illuminating device that is mounted on a transportation machine or the like and used to improve visibility for an operator and conspicuity to the outside. A vehicle headlight is also referred to as a headlamp or headlight.

Thus, when a headlight is taken as an example, it is desired to employ, as a light source, a semiconductor light source having higher luminous efficiency than conventional halogen bulbs (lamp light sources). "Semiconductor light source" refers to, for example, a light emitting diode (LED), laser diode (LD), or the like.

Headlights satisfy a predetermined light distribution pattern specified by road traffic rules or the like. Thus, their optical parts, such as lenses, are arranged accurately.

When an optical part is mounted to a holder for holding a part or the like so that it can withstand vibration of the vehicle, deformation of the part due to heat or the like may damage the optical part. An example is the case where it is mounted using a ring-shaped lens holder. In particular, when an optical part is fixed to a lens barrel, the optical part is highly likely to be damaged. A "lens barrel" is a cylindrical part for supporting lens or the like and performing blocking of outside light or other functions, in a camera or the like.

As an optical part mounting structure that can handle such vibration or heat with a small structure, a method using a plate spring is known.

Patent Literature 1 discloses plate springs 6 that urge a second lens frame 4. The plate springs 6 are arranged at predetermined pitches in a circumferential direction; a base end of each plate spring 6 is detachably fixed to a chucking base 5 with a set screw 7, and the other end is a free end and floated in the optical axis direction.

CITATION LIST

Patent Literature

Patent Literature 1: Japanese Patent Application Publication No. 2005-300859 (paragraph 0007 and FIGS. 2 and 3)

SUMMARY OF INVENTION

Technical Problem

However, the plate springs 6 have a cantilever beam structure. Thus, one end of each plate spring 6 needs to be fixed. For example, in Patent Literature 1, each plate spring 6 is fixed to the chucking base 5 with the set screw 7. The fixing of the plate springs 6 increases the size of the structure.

Solution to Problem

An illumination device according to the present invention includes: a light source including a light emitting element that emits light; a first optical element that transmits the light; a second optical element that transmits the light transmitted by the first optical element; a holder that holds the second optical element; and a spring member including at least one spring portion that generates a spring force by being deflected, the spring member pressing the second optical element against the holder with the spring force to hold the second optical element against the holder, wherein the first optical element and the second optical element deflect a center portion in a long edge direction of the at least one spring portion with respect to ends in the long edge direction of the at least one spring portion.

Advantageous Effects of Invention

The present invention can downsize an illumination device.

BRIEF DESCRIPTION OF DRAWINGS

FIGS. 9A and 9B are side half sectional views of the headlight 120 for explaining the illumination device according to the second modification example.

FIG. 12 is a front exploded perspective view of a headlight 140 for explaining an illumination device according to a fourth modification example.

FIGS. 13A and 13B are side half sectional views of the headlight 140 for explaining the illumination device according the fourth modification example.

DESCRIPTION OF EMBODIMENTS

Figure 1:
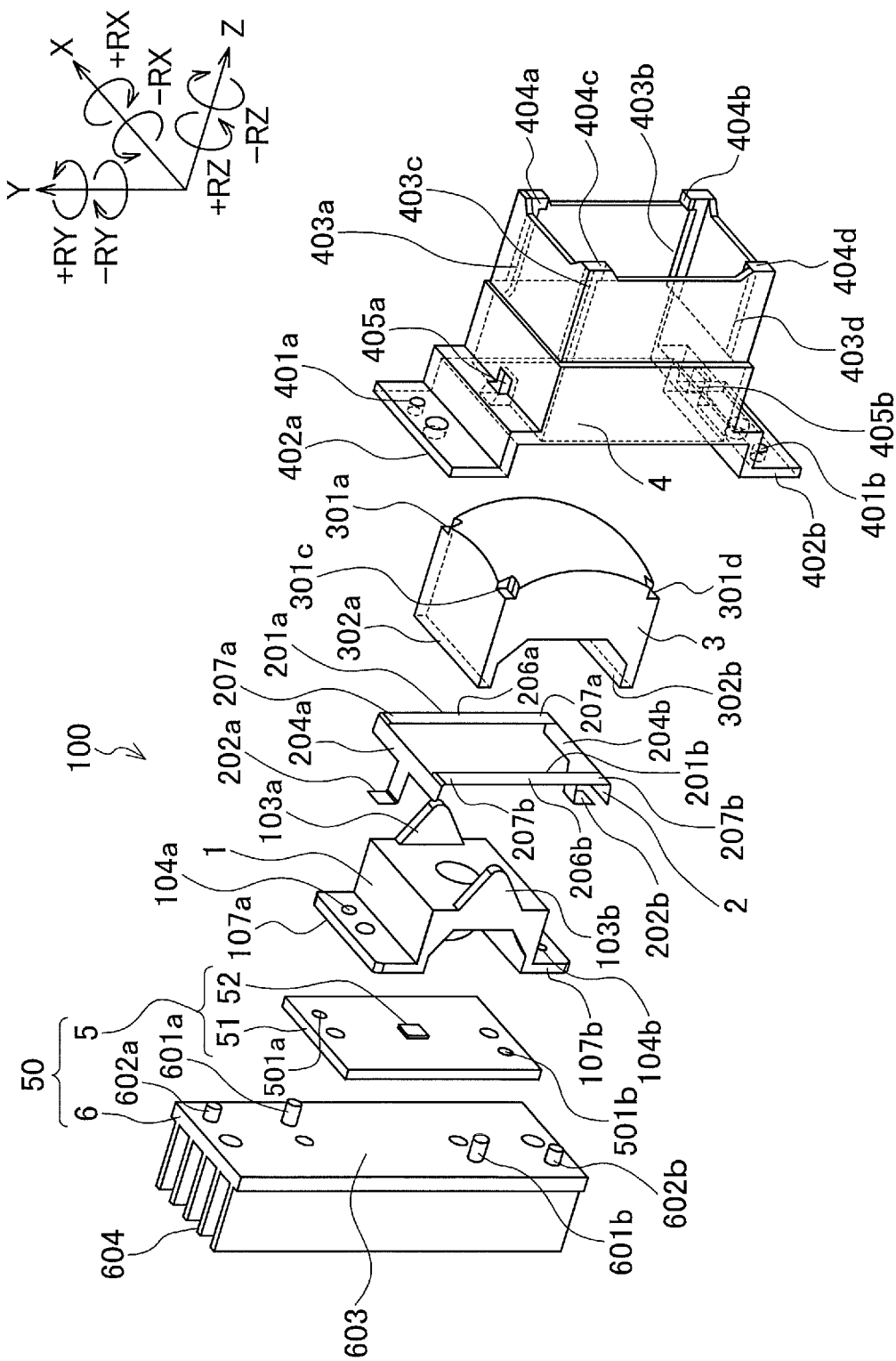
FIG. 1 is a from exploded perspective view of a headlight 100 for explaining an illumination device according to a first embodiment.

Illumination devices described in the following embodiments are suitable for vehicle headlights, as described above. They are also suitable for illumination devices used in vehicles other than headlights, such as direction indicators, front fog lights, tail lights, daytime running lights, or vehicle interior lights.

A direction indicator is a flasher for indicating the direction in which the vehicle is turning. A front fog light is mounted below the headlight and used for illuminating the road surface when the front visibility is limited by dense fog or the like. A tail light is a red light at the rear of the vehicle body. It lets the following vehicle know the existence of the vehicle when the visibility is poor in the night or due to bad weather. A daytime running light is a light that is lit during the daytime. It improves the conspicuity of the vehicle during running to people around the vehicle, thereby preventing traffic accidents. A vehicle interior light is a light for illuminating the inside of the vehicle. A vehicle interior light is automatically lit when a door is opened. A vehicle interior light can also be manually lit.

Besides vehicles, they are also suitable for illumination devices required to be downsized or illumination devices used in places where the environment varies greatly. For example, they are suitable for lights in elevator cars. Elevator illumination devices are desired to be downsized and lightened.

Semiconductor light sources, described above, are a type of solid-state light source. Solid-state light sources include, for example, an organic electroluminescence (organic EL) light source, a light source that irradiates phosphor applied on a plane with excitation light to cause the phosphor to emit light, and other light sources. Also, for these solid-state light sources, it is desirable to use optical systems similar to those for semiconductor light sources.

Excluding bulb light sources, light sources having directivity are referred to as "solid-state light sources."

"Directivity" refers to a property that the intensity of light or the like emitted into space depends on the direction. "Having directivity" here indicates that light travels to a light emitting surface side and no light travels to the side opposite to the light emitting surface, as described above. Thus, the divergence angle of light emitted from the light source is 180 degrees or less.

Light sources described in the following embodiments are described as light sources (solid-state light sources) having directivity. As described above, the main examples thereof are semiconductor light sources, such as light emitting diodes or laser diodes. The light sources also include organic electroluminescence light sources, light sources that irradiate phosphor applied on planes with excitation light to cause the phosphor to emit light, and other light sources.

The reason why solid-state light sources are exemplarily employed in the embodiments is because the use of a bulb light source makes it difficult to meet the demand for energy efficiency improvement. However, if there is no demand for energy efficiency improvement, the light sources may be bulb light sources.

Thus, bulb light sources, such as incandescent lamps, halogen lamps, or fluorescent lamps may be used as a light source of the present invention. Also, semiconductor light sources, such as light emitting diodes (referred to below as LEDs) or laser diodes (referred to below as LDs) may be used as the light source of the present invention. The light source of the present invention is not limited to specific ones and may be any light source.

However, from the viewpoint of reducing the burden on the environment, such as reducing emission of carbon dioxide ($CO_2$) and consumption of energy, it is desirable to employ a semiconductor light source as a light source of a headlight device. Semiconductor light sources have higher luminous efficiency than conventional halogen bulbs (lamp light sources).

Also, from the viewpoint of downsizing and weight reduction, it is desirable to employ a semiconductor light source. Semiconductor light sources have higher directivity than conventional halogen bulbs (lamp light sources), and allow downsizing and weight reduction of the optical system.

Thus, in the following description of the present invention, light sources are described as LEDs, which are a type of semiconductor light source.

First Embodiment

The following embodiments and modification examples describe headlights as examples.

Figure 2:
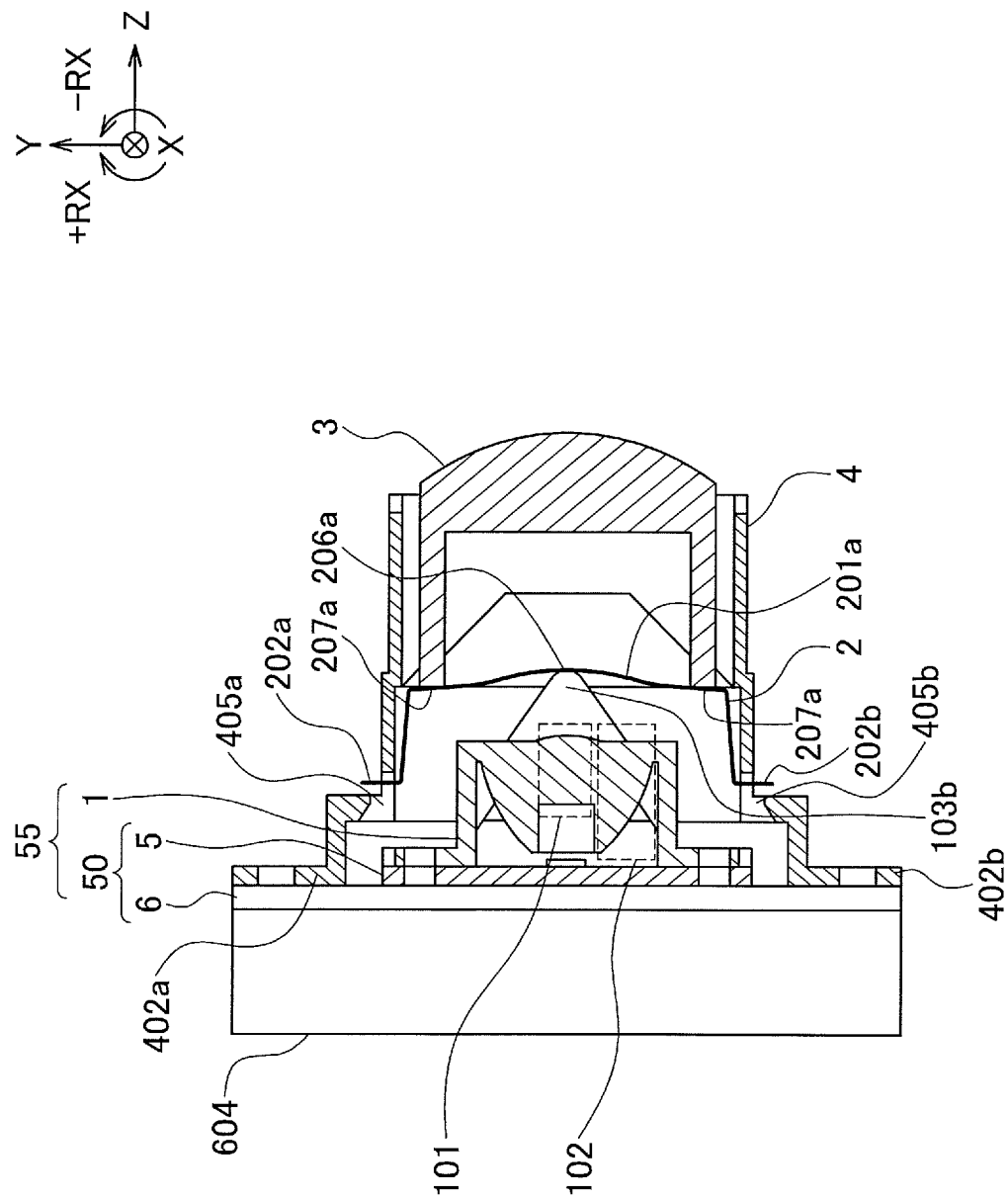
FIG. 2 is a side sectional view of the headlight 100 for explaining the illumination device according to the first embodiment.
Figure 3:
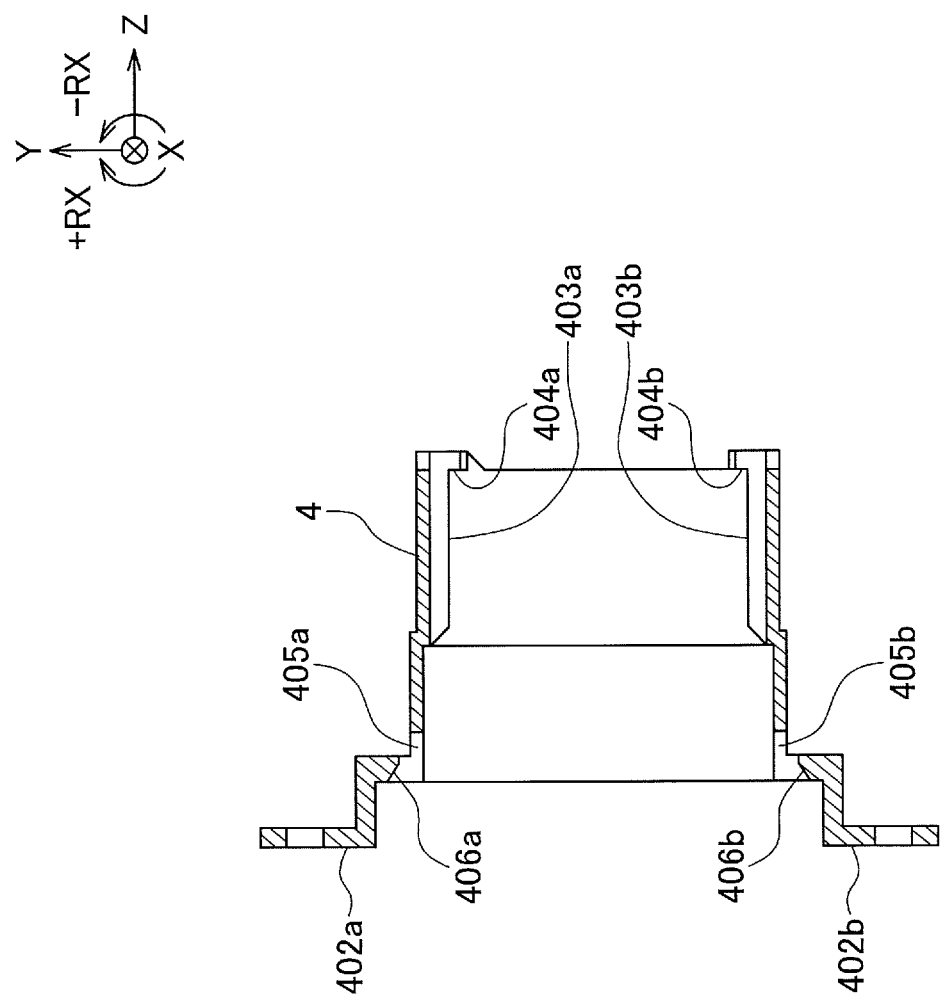
FIG. 3 is a side sectional view of a holder 4 for explaining the illumination device according to the first embodiment.

FIG. 1 is a front exploded perspective view of a headlight 100 according to a first embodiment. FIG. 2 is a side sectional view of the headlight 100 in an assembled state. FIG. 3 is a side sectional view of a holder 4 according to the first embodiment.

To facilitate description, XYZ-orthogonal coordinate axes are shown in each drawing. In the following description, it is assumed that a forward direction of the headlight 100 is the +Z axis direction and a backward direction is the −Z axis direction. A direction in which the headlight 100 projects light is the +Z axis direction. It is assumed that in a state where the headlight 100 is mounted on a vehicle or the like, as one faces in the forward direction (+Z axis direction), a leftward direction of the headlight 100 is the +X axis direction and a rightward direction is the −X axis direction. It is assumed that an upward direction (direction toward the sky) of the headlight 100 is the +Y axis direction and a downward direction (direction toward the ground) of the headlight 100 is the −Y axis direction. The Y axis is vertical to the vehicle. The +Y axis direction is an upward direction of the vehicle. The −Y axis direction is a downward direction of the vehicle.

It is assumed that as one faces in the forward direction, a clockwise direction about the Z axis is the +RZ direction and a counterclockwise direction about the Z axis is the −RZ direction. It is assumed that as the headlight 100 is viewed from the right (the −X axis side) toward the left (the +X axis side), a clockwise direction about the X axis is the +RX direction and a counterclockwise direction about the X axis is −RX direction. It is assumed that as the headlight 100 is viewed from below (the −Y axis side) upward (toward the +Y axis side), a clockwise direction about the Y axis is the +RY direction and a counterclockwise direction about the Y axis is the −RY direction.

The headlight 100 includes a first lens 1, a spring member 2, a second lens 3, the holder 4, and a light emitter 5. The headlight 100 may also include a heat dissipation unit 6. The headlight 100 is, for example, a driving headlight (high beam).

When the features of the spring member 2 are considered, it is possible to consider as follows. The first lens 1 can be considered as a first optical element. The second lens 3 can be considered as a second optical element. The light emitter 5 can be considered as a second holder. In this case, the holder 4 is considered as a first holder.

In the following embodiments and modification examples, headlights are described as examples. Thus, the first lens 1 is described as a condensing lens. The second lens 3 is described as a projection lens.

<Light Emitter 5>

The light emitter 5 emits light, which is projected by the headlight 100. The light emitter 5 includes, for example, a substrate 51 and a light emitting element 52.

For example, a light emitting diode (LED), an electroluminescence element, a laser diode, or the like may be used as the light emitting element 52. The following description assumes, as an example, that the light emitter 5 is a light emitting diode.

For example, an electronic part for driving the light emitting element 52, or the like is mounted on the substrate 51.

The light emitter 5 has positioning holes 501a and 501b in the substrate 51 with the light emitting element 52 mounted thereon, for example. When the substrate 51 is located parallel to an X-Y plane, the positioning holes 501a and 501b are holes parallel to the Z axis direction. The light emitting element 52 is mounted on the substrate 51. The positioning holes 501a and 501b are provided in the substrate 51.

<Heat Dissipation Unit 6>

The heat dissipation unit 6 releases heat generated by the light emitter 5 to the outside. For example, the heat dissipation unit 6 releases heat generated by the light emitting element 52. The heat dissipation unit 6 releases heat generated by the electronic part mounted on the substrate 51.

The heat dissipation unit 6 is, for example, mounted to the light emitter 5. For example, the heat dissipation unit 6 is mounted to the substrate 51 of the light emitter 5. The heat dissipation unit 6 is mounted on the back side (−Z axis side) of the light emitter 5. The light emitting element 52 is mounted on a front surface side of the substrate 51. The heat dissipation unit 6 is mounted on a back surface side of the substrate 51.

The heat dissipation unit 6 includes, for example, positioning pins 601a and 601b, and positioning pins 602a and 602b. The positioning pins 601a and 601b are shafts parallel to the Z axis direction. The positioning pins 602a and 602b are shafts parallel to the Z axis direction. The positioning pins 601a and 601b are shafts perpendicular to a mounting surface 603. The positioning pins 602a and 602b are shafts perpendicular to the mounting surface 603.

The positioning pins 601a and 601b are disposed on the mounting surface 603 of the heat dissipation unit 6. The positioning pins 602a and 602b are disposed on the mounting surface 603 of the heat dissipation unit 6. The mounting surface 603 of the heat dissipation unit 6 is a surface that abuts the light emitter 5. The mounting surface 603 of the heat dissipation unit 6 is a surface that abuts the substrate 51. In FIG. 1, the mounting surface 603 is, for example, a surface of the heat dissipation unit 6 on the +Z axis side. The mounting surface 603 is, for example, a surface parallel to an X-Y plane.

When the light emitter 5 is mounted to the heat dissipation unit 6, the positioning pins 601a and 601b are inserted in the positioning holes 501a and 501b. The positioning pins 601a and 601b are inserted in the positioning holes 501a and 501b. The positioning pins 601a and 601b are inserted in the positioning holes 501a and 501b. Thereby, the light emitter 5 is positioned relative to the heat dissipation unit 6. The positioning pins 601a and 601b and positioning holes 501a and 501b determine the position of the light emitter 5 in an X-Y plane relative to the heat dissipation unit 6. The position of the light emitter 5 relative to the heat dissipation unit 6 is determined on the mounting surface 603.

In FIG. 1, a light source 50 includes the light emitter 5 and heat dissipation unit 6. The light source 50 includes the light emitter 5. The light source 50 can include the heat dissipation unit 6. For example, when the light emitter 5 has no thermal problem, the light source 50 need not include the heat dissipation unit 6.

<Condensing Lens 1 (First Lens 1)>

The first lens 1 concentrates light emitted from the light emitter 5, for example. The first lens 1 is, for example, a condensing lens. The first lens 1 is, for example, an optical element including a portion (refracting portion 101) that concentrates light by refraction and a portion (reflecting portion 102) that concentrates light by reflection. To facilitate description, the optical element including the portion (refracting portion 101) that concentrates light by refraction and the portion (reflecting portion 102) that concentrates light by reflection will be described as the condensing lens.

The refracting portion 101 intersects an optical axis of the first lens 1, The optical axis of the condensing lens 1 has an intersection with a surface of the refracting, portion 101. The reflecting portion 102 is located around (or in the vicinity of) the refracting portion 101, in a direction perpendicular to the optical axis of the condensing lens 1. The reflecting portion 102 is located on an outer circumference side of the refracting portion 101.

The condensing lens 1 refracts, at the refracting portion 101, light rays having small divergence angles of the light emitted from the light emitter 5 to concentrate them. The condensing lens 1 reflects, at the reflecting portion 102, light rays having large divergence angles of the light emitted from the light emitter 5 to concentrate them.

The reflecting portion 102 concentrates light emitted from the light emitter 5 at a divergence angle larger than that of light concentrated by the refracting portion 101. The light concentrated by the reflecting portion 102 is emitted from the light emitter 5 at a divergence angle larger than that of the light concentrated by the refracting portion 101.

The light rays are concentrated by the condensing lens 1 in front (on the +Z axis side) of the condensing lens 1. The light rays are concentrated by the condensing lens 1. For example, in the optical axis direction of the condensing lens 1, a light concentration position of the light rays concentrated by the refracting portion 101 may be different from a light concentration position of the light rays concentrated by the reflecting portion 102.

The condensing lens 1 is not limited to the lens having the above-described functions and configuration, and may be a common lens. However, when an LED light source having a large divergence angle is used, the use of the condensing lens having the above-described configuration allows light to be efficiently concentrated with a small configuration. "Divergence angle" refers to an angle at which light spreads.

The condensing lens 1 includes abutment portions 107a and 107b. The abutment portions 107a and 107b are disposed at ends of the condensing lens 1 in the Y axis direction, for example. The abutment portion 107a is disposed at an end of the condensing lens 1 on the +Y axis side, for example. The abutment portion 107b is disposed at an end of the condensing lens 1 on the −Y axis side, for example. The abutment portions 107a and 107b are disposed on the outer periphery of the condensing lens 1. Contact surfaces of the abutment portions 107a and 107b are disposed on a side of the condensing lens 1 on which light is incident.

The abutment portions 107a and 107b abut the substrate 51 of the light emitter 5, for example. Surfaces of the abutment portions 107a and 107b on the −Z axis side abut an surface of the substrate 51 on the +Z axis side. Thus, the first lens 1 and light emitter 5 are positioned in the optical axis direction (Z axis direction). The surfaces of the abutment portions 107a and 107b on the −Z axis side are the contact surfaces. The contact surfaces of the abutment portions 107a and 107b abut the substrate 51. The contact surfaces of the abutment portions 107a and 107b are, for example, surfaces perpendicular to the optical axis of the condensing lens 1.

The condensing lens 1 has positioning holes 104a and 104b. In FIG. 1, the positioning holes 104a and 104b are provided in the abutment portions 107a and 107b of the condensing lens 1. The positioning hole 104a is provided in the abutment portion 107a. The positioning hole 104b is provided in the abutment portion 107b. The positioning holes 104a and 104b are holes perpendicular to the contact surfaces of the abutment portions 107a and 107b.

The positioning pin 601a of the heat dissipation unit 6 is inserted in the positioning hole 501a of the light emitter 5 and the positioning hole 104a of the condensing lens 1. The positioning pin 601b of the heat dissipation unit 6 is inserted in the positioning hole 501b of the light emitter 5 and the positioning hole 104b of the condensing lens 1.

Thereby, the light emitter 5 and condensing lens 1 are positioned in directions perpendicular to the optical axis of the condensing lens 1. Also, the light emitter 5 and heat dissipation unit 6 are positioned in directions perpendicular to the optical axis of the condensing lens 1. Also, the condensing lens 1 and heat dissipation unit 6 are positioned in directions perpendicular to the optical axis of the condensing lens 1.

The light emitter 5 is between the condensing lens 1 and the heat dissipation unit 6. The light emitter 5 is between the condensing lens 1 and the heat dissipation unit 6, in the optical axis direction of the condensing lens 1. The light emitter 5 is held by the heat dissipation unit 6 together with the condensing lens 1. The light emitter 5 is held by the heat dissipation unit 6. The condensing lens 1 is held by the heat dissipation unit 6.

It is also possible to separately provide positioning pins for positioning the light emitter 5 relative to the heat dissipation unit 6 are positioning pins for positioning the condensing lens 1 relative to the heat dissipation unit 6.

In FIG. 1, the heat dissipation unit 6 includes five heat dissipation fins. However, the shape or number of heat dissipation fins is not limited to this.

The condensing lens 1 includes pressing portions 103a and 103b. "Pressing" refers to exerting force to push.

The pressing portions 103a and 103b are disposed on a surface of the condensing lens 1 on the +Z axis side. In FIG. 1, the condensing lens 1 includes the two pressing portions 103a and 103b. The pressing portions 103a and 103b are disposed on the +X axis side and −X axis side of the optical axis of the condensing lens 1. The pressing portion 103a is located on the +X axis side of the condensing lens 1. The pressing portion 103b is located on the −X axis side of the condensing lens 1. The pressing portions 103a and 103b are disposed outside a region through which light reflected by the reflecting portion 102 is emitted. The pressing portions 103a and 103b are disposed on a side (the +Z axis side) from which the condensing lens 1 emits light.

The pressing portions 103a and 103b have convex shapes projecting toward the +Z axis side. In FIG. 1, the pressing portions 103a and 103b have, for example, triangular shapes. One vertex of each of the triangular shapes corresponds to an apex position of the corresponding convex shape. The pressing portions 103a and 103b are, for example, plate-shaped. In FIG. 1, the pressing portions 103a and 103b are disposed parallel to a Y-Z plane. The pressing portions 103a and 103b project in a direction in which the condensing lens 1 emits light.

<Projection Lens 3 (Second Lens 3)>

The second lens 3 transmits light emitted from the first lens (condensing lens) 1. The second lens 3 then emits the light emitted from the first lens 1 in the forward direction (+Z axis direction).

The second lens 3 is, for example, a projection lens. The following describes the second lens 3 as a projection lens 3. The projection lens 3 projects a light distribution pattern formed by the condensing lens 1, in the forward direction. The projection lens 3 projects the light distribution pattern formed by the condensing lens 1 to a forward irradiation surface.

The projection lens 3 projects the first light distribution pattern formed by the condensing lens 1, as a second light distribution pattern. The first light distribution pattern is a light distribution pattern formed inside the headlight 100. The second light distribution pattern is a light distribution pattern projected in front of the headlight 100.

The irradiation surface is a virtual surface defined at a predetermined position in front of the vehicle. The irradiation surface is a surface parallel to an X-Y plane to be described later. The predetermined position in front of the vehicle is a position at which the luminous intensity or illuminance of the headlight device is measured, and is specified in road traffic rules or the like. For example, in Europe, United Nations Economic Commission for Europe (UNECE) specifies a position 25 m from a light source as the position at which the luminous intensity of an automobile headlight device is measured. In Japan, Japanese Industrial Standards Committee (JIS) specifies a position 10 m from a light source as the position at which the luminous intensity is measured.

The projection lens 3 is disposed in the forward direction (+Z axis direction) from the condensing lens 1.

The projection lens 3 has, for example, a rectangular shape as viewed from the front (+Z axis side).

The projection lens 3 includes leg portions 302a and 302b. The leg portions 302a and 302b are disposed on an incident surface side (the −Z axis side) of the projection lens 3. The leg portions 302a and 302b are disposed on a side (the Z. axis side) of the projection lens 3 on which light is incident. The leg portions 302 are supporting portions that support both ends (support portions 207) in a long edge direction of each of flexible portions 201. The leg portions 302 are provided at ends in a radial direction of the projection lens 3.

The flexible portions 201 are disposed away from an inner surface of the holder 4. Thus, spring forces of the flexible portions 201 are not affected by the inside of the holder 4.

The leg portions 302a and 302b are disposed, for example, on the +Y axis side and −Y axis side of the projection lens 3. The leg portion 302a is disposed on the +Y axis side of the projection lens 3. The leg portion 302b is disposed on the −Y axis side of the projection lens 3.

However, for example, when the headlight 100 projects a horizontally long light distribution pattern, the leg portions 302a and 302b can be disposed on the +X axis side and −X axis side of the projection lens 3. The "horizontally long light distribution pattern" is a light distribution pattern that is longer in a horizontal direction (the X axis direction) than in a vertical direction (the Y axis direction). In the case of the horizontally long light distribution pattern, the horizontal dimension of the projection lens 3 is greater than the vertical dimension. The flexible portions 201*a* and 201*b* of the spring member 2 are disposed parallel to the horizontal direction (X axis direction). This allows the flexible portions 201*a* and 201*b* of the spring member 2 to be lengthened.

The leg portions 302*a* and 302*b* project toward the −Z axis side of the projection lens 3. The leg portions 302*a* and 302*b* have, for example, plate shapes. In FIG. 1, the leg portions 302*a* and 302*b* have plate shapes parallel to a Z-X plane. The leg portions 302*a* and 302*b* project toward a side from which light is incident on the projection lens 3.

The projection lens 3 includes abutment portions 301*a*, 301*b*, 301*c*, and 301*d*. The abutment portions 301 are disposed, for example, at four corners on the emitting surface side (+Z axis side) of the projection lens 3. "Abutment" refers to touching and being in contact with a portion. The abutment portions 301 are disposed on a side of the projection lens 3 from which light is emitted.

In FIG. 1, the abutment portions 301 are concave portions relative to the emitting surface of the projection lens 3. The concave portions as the abutment portions 301 have surfaces parallel to an X-Y plane. The surfaces of the four abutment portions 301*a*, 301*b*, 301*c*, and 301*d* parallel to an X-Y plane are located on the same plane.

To stably hold the projection lens 3, the number of abutment portions 301 may be three or five.

The projection lens 3 may be an optical element obtained by providing a lens function to an emitting surface of a light guide member. The lens function is, for example, the function of a projection lens. In this case, light emitted from the condensing lens 1 propagates inside the light guide member. The light propagating inside the light guide member is projected forward when passing through the emitting surface. The emitting surface of the light guide member projects the light propagating inside the optical member.

<Holder 4>

The holder 4 houses the light emitter 5, condensing lens 1, and projection lens 3, for example. The holder 4 holds the light emitter 5, condensing lens 1, and projection lens 3, for example. The holder 4 has a function of a lens barrel. The holder 4 may hold some of the light emitter 5, condensing lens 1, and projection lens 3, for example.

The holder 4 includes abutment portions 402*a* and 402*b*. The abutment portions 402*a* and 402*b* are portions that abut the heat dissipation unit 6. The abutment portions 402*a* and 402*b* abut the mounting surface 603 of the heat dissipation unit 6.

In FIG. 1, the abutment portions 402*a* and 402*b* are disposed on the −Z axis side of the holder 4. Contact surfaces of the abutment portions 402*a* and 402*b* are surfaces parallel to an X-Y plane. In a state where the projection lens 3 is held in the holder 4, the abutment portions 402*a* and 402*b* are located on a side from which the projection lens 3 receives light.

The abutment portions 402*a* and 402*b* have, for example, flange shapes. The abutment portions 402*a* and 402*b* have, for example, flange shapes projecting in the +Y axis direction and −Y axis direction. The abutment portion 402*a* has a flange shape projecting in the +Y axis direction. The abutment portion 402*b* has a flange shape projecting in the −Y axis direction.

The holder 4 has positioning holes 401*a* and 401*b*. The positioning holes 401*a* and 401*b* are holes parallel to the Z axis. The positioning holes 401*a* and 401*b* are disposed in the abutment portions 402*a* and 402*b*. The positioning holes 401*a* and 401*b* are holes perpendicular to the contact surfaces of the abutment portions 402*a* and 402*b*.

The positioning pins 602*a* and 602*b* of the heat dissipation unit 6 are inserted in the positioning holes 401*a* and 401*b* of the holder 4. Thus, the holder 4 is positioned relative to the heat dissipation unit 6.

The mounting surface 603 of the heat dissipation unit 6 abuts the contact surfaces of the abutment portions 402*a* and 402*b*. Thereby, the holder 4 is positioned relative to the heat dissipation unit 6 in the Z axis direction. The positioning pins 602*a* and 602*b* of the heat dissipation unit 6 are inserted in the positioning holes 401*a* and 401*b* of the holder 4, and thereby the holder 4 is positioned relative to the heat dissipation unit 6 in an X-Y plane. The Z axis direction is an optical axis direction of the projection lens 3. The holder 4 is positioned relative to the heat dissipation unit 6 in the optical axis direction of the projection lens 3.

The holder 4 has guide surfaces 403. The guide surfaces 403 are surfaces for guiding the projection lens 3 when the projection lens 3 is placed into the holder 4. As described above, the projection lens 3 is rectangular as viewed from the front (+Z axis side). The guide surfaces 403 guide four corners of the projection lens 3. Also, the guide surfaces 403 are surfaces for holding the projection lens 3.

The guide surfaces 403 are formed inside the holder 4. The guide surfaces 403 are surfaces extending in the Z axis direction. The guide surfaces 403 are, for example, surfaces parallel to a Z-X plane. The guide surfaces 403 are disposed at four corners of the holder 4.

In FIG. 1, the guide surfaces 403 are surfaces parallel to a Z-X plane. A side surface of the projection lens 3 on the +Y axis side abuts guide surfaces 403*a* and 403*c* of the holder 4. A side surface of the projection lens 3 on the −Y axis side abuts guide surfaces 403*b* and 403*d* of the holder 4.

A side surface of the projection lens 3 on the +X axis side abuts an inner surface of the holder 4 on the +X axis side. A side surface of the projection lens 3 on the −X axis side abuts an inner surface of the holder 4 on the −X axis side.

Thereby, the projection lens 3 is positioned relative to the holder 4 in the X axis direction and Y axis direction.

The holder 4 includes abutment portions 404*a*, 404*b*, 404*c*, and 404*d*. The abutment portions 404 are disposed at four corners of the holder 4 on the +Z axis side. The abutment portions 404 project toward a hollow space that houses the second lens 3. The abutment portions 404 have, on the −Z axis side, surfaces parallel to an X-Y plane, for example.

The projection lens 3 receives light from the −Z axis side. The projection lens 3 emits light from the +Z axis side. An X-Y plane is a plane perpendicular to the optical axis of the projection lens 3.

The holder 4 has holes 405. The holes 405 are holes for positioning the spring member 2 relative to the holder 4. The holes 405 are, for example, holes for temporarily positioning the spring member 2 relative to the holder 4.

A hole 405*a* is disposed in a side surface of the holder 4 on the +Y axis side. A hole 405*b* is disposed in a side surface of the holder 4 on the −Y axis side. The holes 405 are located on the −Z axis side of the positions of the leg portions 302 when the projection lens 3 is placed in the holder 4.

As illustrated in FIG. 3, the holes 405*a* and 405*b* have inclined surfaces 406*a* and 406*b*. The inclined surface 406*a* is inclined in the +RX direction with respect to an X-Z plane. The inclined surface 406b is inclined in the −RX direction with respect to an X-Z plane. The inclined surfaces 406 are inclined so that the surfaces face in the −Z axis direction. A distance between the inclined surfaces 406a and 406b on the +Z axis side is smaller than a distance between the inclined surfaces 406a and 406b on the −Z axis side.

The projection lens 3 is inserted into the holder 4 from the −Z axis side. The projection lens 3 is inserted into the holder 4 in the +Z axis direction. The projection lens 3 is inserted into the holder 4 from the −Z axis direction side, for example. The projection lens 3 is inserted into the +Z axis direction while guided by the guide surfaces 403. The projection lens 3 is inserted into the +Z axis direction while the four corners of the projection lens 3 are guided by the guide surfaces 403, for example.

Then, the abutment portions 301 of the projection lens 3 abut the abutment portions 404. The abutment portions 404 abut the abutment portions 301 of the projection lens 3. The abutment portions 301a, 301b, 301c, and 301d abut the abutment portions 404a, 404b, 404c, and 404d, respectively. The abutment portions 301a, 301b, 301c, and 301d are provided in the projection lens 3. The abutment portions 404a, 404b404c, and 404d are provided in the holder 4.

When the abutment portions 301 abut the abutment portions 404, the projection lens 3 is positioned relative to the holder 4. The abutment portions 404 position the projection lens 3 relative to the holder 4 in the optical axis direction (Z axis direction).

The projection lens 3 may be positioned relative to the holder 4 by means of positioning pins and positioning holes or by other methods.

It is also possible, for example, to provide a rib at a position of each of the leg portions 302a and 302b. The leg portion 302a is provided with a rib extending in the +Y axis direction. The leg portion 302b is provided with a rib extending in the −Y axis direction. These ribs abut the holder 4, thereby positioning the second lens 3 relative to the holder 4. The ribs are, for example, projections. It is also possible to provide a projection at a position of each of the leg portions 302a and 302b.

In the case of this configuration, there is no need to provide the projection lens 3 with the abutment portions 301 and provide the holder 4 with the abutment portions 404.

<Spring Member 2>

The spring member 2 urges the condensing lens 1 and projection lens 3, in the holder 4. "Urges" indicates that a spring or the like exerts force while storing energy. Thus, urging force refers to, for example, spring force or elastic force. The spring member 2 exerts spring force on the condensing lens 1 and projection lens 3. The spring member 2 applies spring force to the condensing lens 1. The spring member 2 applies force to the projection lens 3.

The spring member 2 has a spring property. The spring member 2 is, for example, a plate spring. The spring member 2 is formed by, for example, folding a thin metal plate.

The spring member 2 has, for example, a frame shape. A region inside the frame is a region through which light emitted from the condensing lens 1 passes toward the projection lens 3.

The spring member 2 includes the flexible portions 201a and 201b. The flexible portions 201a and 201b are elements forming the frame shape of the spring member 2.

The flexible portions 201a and 201b include, for example, plate-shaped portions parallel to an X-Y plane. The flexible portion 201a is located on the +X axis side of the spring member 2. The flexible portion 201b is located on the −X axis side of the spring member 2.

The flexible portions 201a and 201b have spring regions. That is, the flexible portions 201a and 201b have regions functioning as springs. The flexible portions 201a and 201b are spring portions. In the first embodiment, the spring regions are plate springs. The plate springs of the flexible portions 201a and 201b are disposed, for example, parallel to a plane perpendicular to the optical axis of the projection lens 3.

Connecting portions 204 are portions that connect the flexible portions 201a and 201b. The connecting portions 204 have, for example, plate-shaped portions parallel to a Z-X plane. The connecting portions 204 are elements forming the frame shape of the spring member 2.

The spring member 2 includes, for example, the two flexible portions (spring portions) 201a and 201b and two connecting portions 204. The connecting portions 204a and 204b connect the ends of the flexible portions (spring portions) 201a and 201b. The two flexible portions 201a and 201b are disposed to face each other with the optical axis of the projection lens 3 therebetween. The two connecting portions 204a and 204b are disposed to face each other with the optical axis of the projection lens 3 therebetween. The flexible portions 201a and 201b and the connecting portions 204a and 204b form the frame shape.

In the first embodiment, for example, the spring member 2 is made by folding a plate. The connecting portions 204 are folded at 90 degrees relative to the flexible portions 201. In the first embodiment, the connecting portions 204 are folded in the −Z axis direction relative to the flexible portions 201.

The spring member 2 includes hook portions 202a and 202b. The hook portions 202 are hooked in the holes 405 of the holder 4.

The hook portions 202 have L-shapes. The hook portions 202 are located, for example, at centers of the connecting portions 204 in the X axis direction. The hook portions 202 extend from the connecting portions 204 in the −Z axis direction. Tips of the L-shapes of the hook portions 202 are folded outside of the frame shape of the spring member 2. Each hook portion 202 is located, for example, at a center between both ends of the connecting portion 204 connected to the flexible portions 201.

Figure 4A:
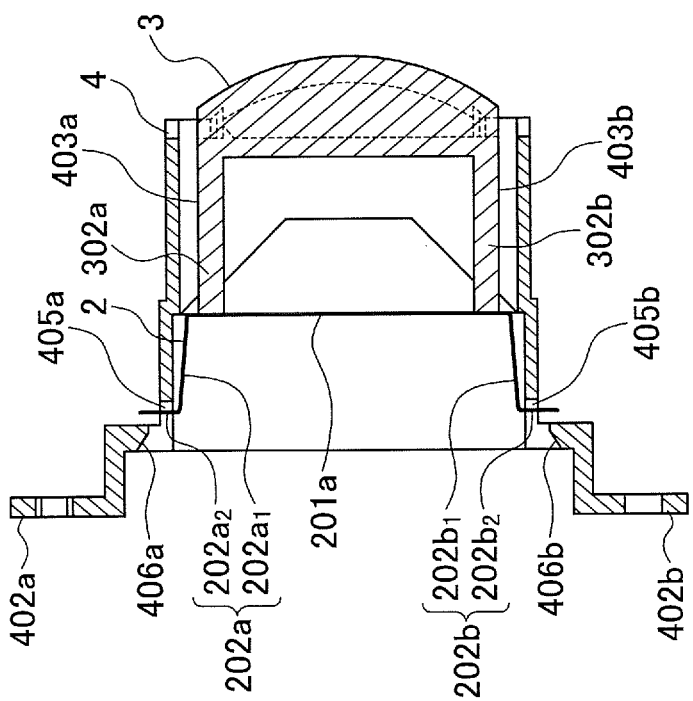
FIGS. 4A and 4B are side sectional views of a case 4, spring member 2, and a second lens for explaining the illumination device according to the first embodiment.
Figure 4B:
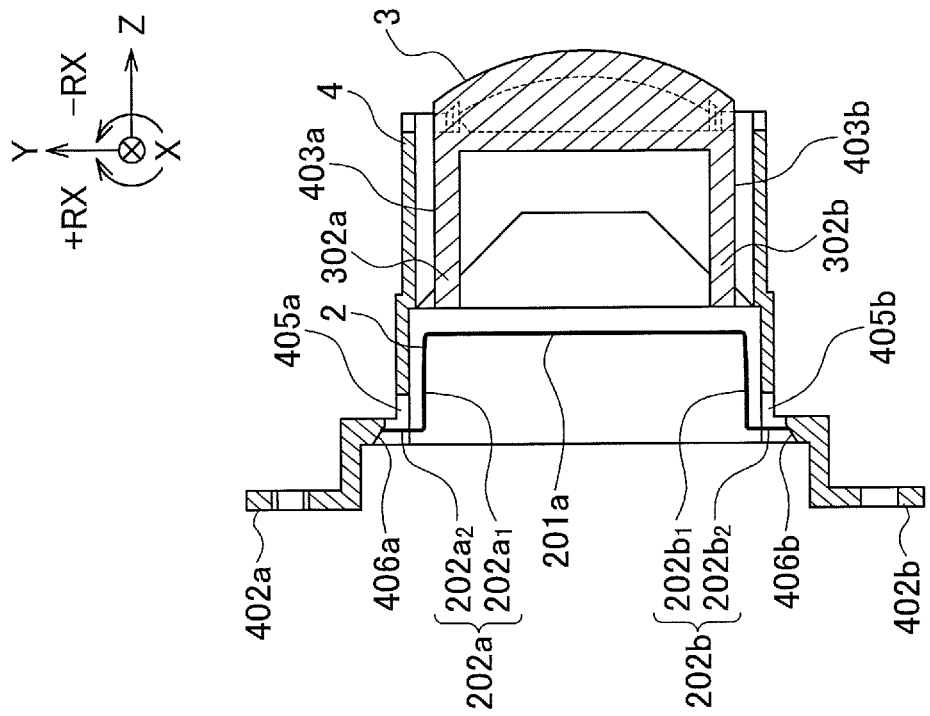

As illustrated in FIGS. 4A and 4B, the hook portion 202a includes a folded portion $202a_1$ and a tip portion $202a_2$. The folded portion $202a_1$ is a plate-like portion parallel to an X-Y plane. The tip portion $202a_2$ is a plate-like portion parallel to an X-Y plane. The hook portion 202a is located on the +Y axis side of the spring member 2. The tip portion $202a_2$ is a portion folded outside of the frame shape of the spring member 2. The hook portion 202a is connected to the connecting portion 204a, The hook portion 202a includes the plate-like portion (folded portion $202a_1$) parallel to an X-Z plane and the plate-like portion (tip portion $202a_2$) parallel to an X-Y plane. The tip portion $202a_2$, extends from the folded portion $202a_1$ in the +Y axis direction. The tip portion $202a_2$ is disposed at a tip of the folded portion $202a_1$. The tip portion $202a_2$ is inserted in, the hole 405a, The hook portion 202b includes a folded portion $202b_1$ and a tip portion $202b_2$. The folded portion $202b_1$ is a plate-like portion parallel to a Z-X plane. The tip portion $202b_2$ is a plate-like portion parallel to an X-Y plane. The hook portion 202b is located on the −Y axis side of the spring member 2. The tip portion $202b_2$ is a portion folded outside of the frame shape of the spring member 2. The hook portion 202b is connected to the connecting portion 204b. The tip portion $202b_2$ extends from the folded portion $202b_1$ in the −Y axis direction. The tip portion 202$b_2$ is disposed at a tip of the folded portion 202$b_1$. The tip portion 202$b_2$ is inserted in the hole 405b.

As above, the spring member 2 includes the flexible portions 201 and hook portions 202. The spring member 2 has a shape that does not block the light beam from the condensing lens 1 toward the projection lens 3.

<Method of temporarily assembling projection lens 3 using spring member 2>

FIGS. 4A and 4B are side sectional views for explaining a method of temporarily assembling the projection lens 3 using the spring member 2. FIG. 4A illustrates a state where the projection lens 3 is placed in the holder 4. The spring member 2 is about to be mounted into the holder 4, FIG. 4B illustrates a state where the spring member 2 is placed in the holder 4 in addition to the projection lens 3.

After the projection lens 3 is placed in the holder 4, the spring member 2 is inserted into the holder 4 from the −Z axis side of the holder 4 in the +Z direction. When the spring member 2 is inserted into the holder 4, the hook portions 202a and 202b of the spring member 2 abut the inclined surfaces 406a and 407b of the holder 4. Specifically, the tip portions 202$a_2$ and 202$b_2$ abut the inclined surfaces 406a and 406b of the holder 4. Accordingly, the folded portion 202$a_1$ deflects in the −Y axis direction. The hook portion 202a deforms in the −Y axis direction. The folded portion 202$b_1$ deflects in the +Y axis direction. The hook portion 202b deforms in the +Y axis direction.

When the spring member 2 is further moved in the +Z axis direction, the hook portions 202 are inserted into the holes 405 provided in the holder 4. The tip portions 202$a_2$ and 202$b_2$ are inserted into the holes 405a and 405b provided in the holder 4. The spring member 2 returns to its original shape. The deflection of the folded portions 202$a_1$ and 202$b_1$ is eliminated.

When the spring member 2 returns to its original shape, an end of the hook portion 202a on the +Y axis side is located on the +Y axis side of an end of the inclined surface 406a on the −Y axis side. An end of the tip portion 202$a_2$ on the +Y axis side is located on the +Y axis side of the end of the inclined surface 406a on the −Y axis side. The tip portion 202$a_2$ is located on the +Y axis side of the folded portion 202$a_1$. An end of the hook portion 202b on the −Y axis side is located on the −Y axis side of an end of the inclined surface 406b on the +Y axis side. An end of the tip portion 202$b_2$ on the −Y axis side is located on the −Y axis side of an end of the inclined surface 406b on the +Y axis side. The tip portion 202$b_2$ is located on the −Y axis side of the folded portion 202$b_1$. Thus, the spring member 2 is prevented from coming off the holder 4. Thus, the second lens 3 is also prevented from coming off the holder 4.

This temporary assembly can reduce workload during, for example, the assembly.

<Method of fixing projection lens 3 with spring member 2>

Figure 5A:
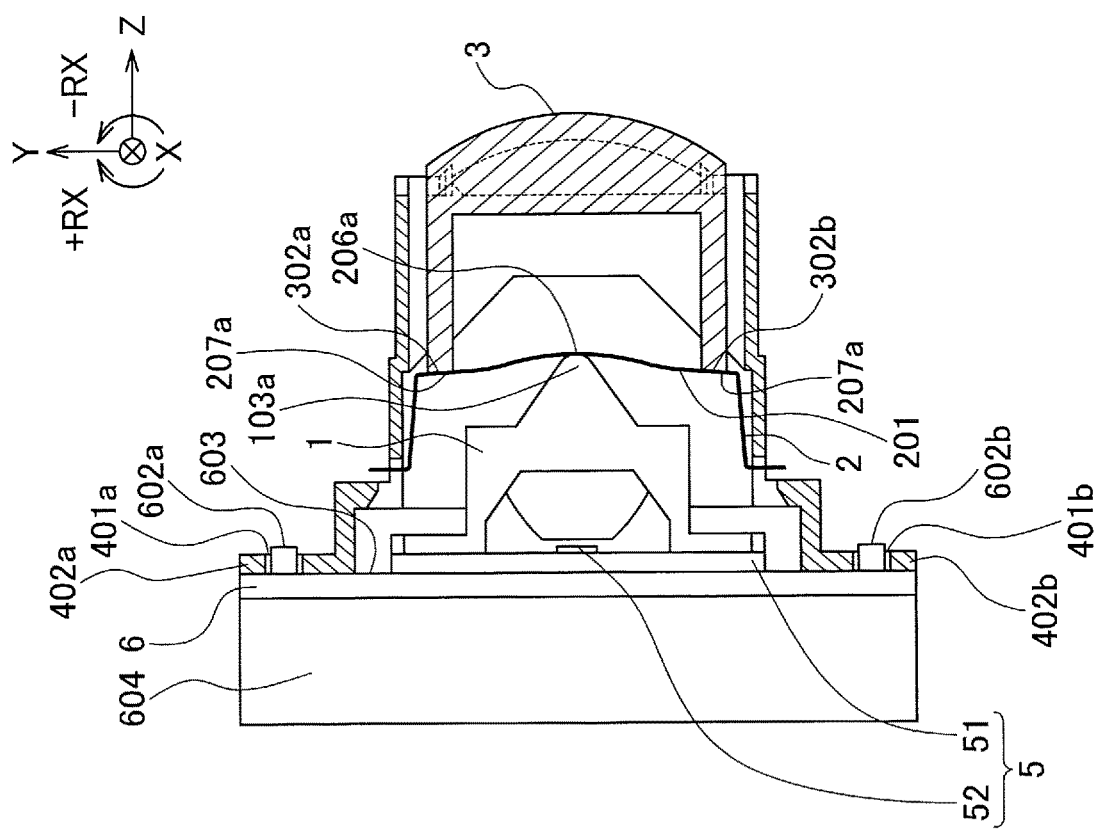
FIGS. 5A and 5B are side half sectional views of the headlight 100 for explaining the illumination device according to the first embodiment.
Figure 5B:
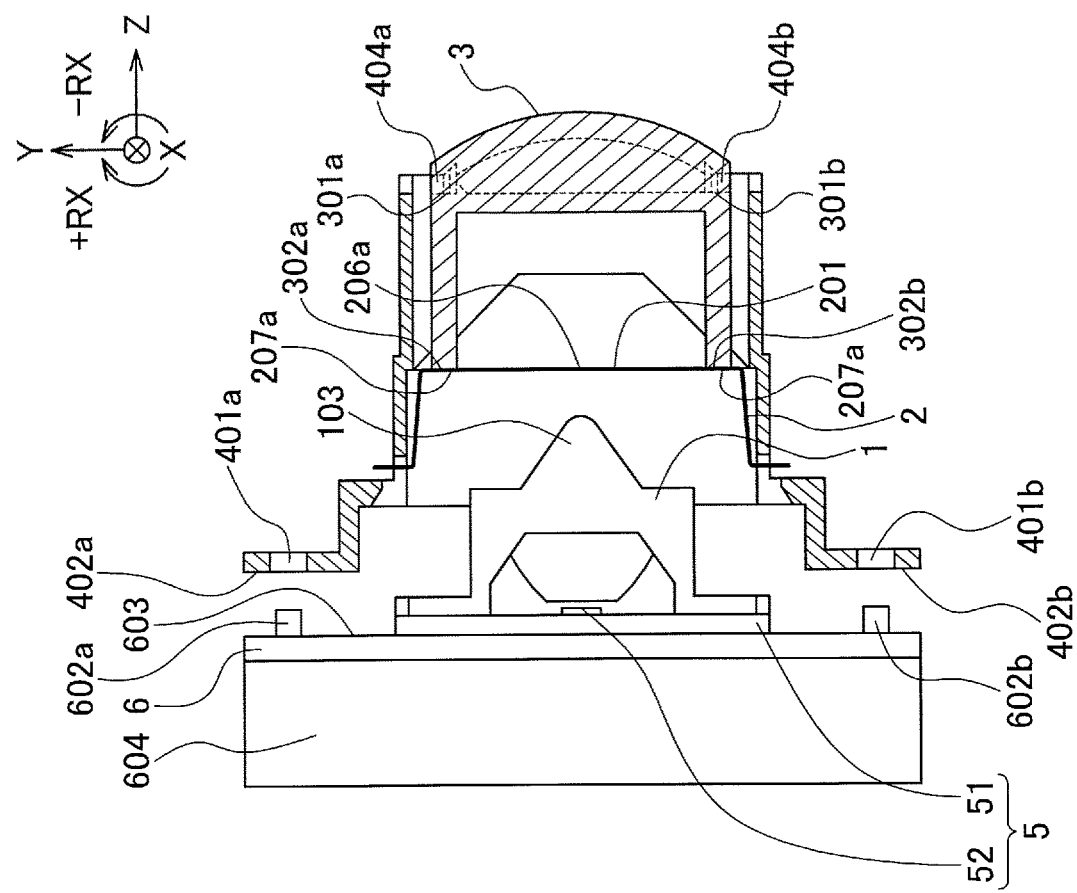

FIGS. 5A and 5B are side sectional views for explaining a method of holding the projection lens 3 in the holder 4 with the spring member 2. FIG. 5A illustrates a state where the projection lens 3 is temporarily mounted to the holder 4 with the spring member 2. This is the state of FIG. 4B. FIG. 5B illustrates a state where a unit (light source unit 55) obtained by mounting condensing lens 1 and light emitter 5 to the heat dissipation unit 6 is placed in the holder 4.

The condensing lens 1 and light emitter 5 are held by the heat dissipation unit 6, for example. The light source unit 55 is a unit obtained by mounting the first lens 1 and light emitter 5 to the heat dissipation unit 6.

The light source unit 55 is inserted from the −Z axis side of the holder 4 in the +Z axis direction. At this time, the pressing portions 103 abut the flexible portions 201. The pressing portions 103 are provided in the condensing lens 1. The flexible portions 201 are provided in the spring member 2.

As illustrated in FIGS. 5A and 5B, the heat dissipation unit 6 is moved in the +Z axis direction until the mounting surface 603 of the heat dissipation unit 6 abuts the abutment portions 402a and 402b of the holder 4. At this time, the pressing portions 103 press center portions 206 in the Y axis direction of the flexible portions 201, in the +Z axis direction. The center portions 206 are portions at centers of the flexible portions 201 in the Y axis direction. The flexible portions 201 are pressed by the pressing portions 103 into convex shapes projecting in the +Z axis direction. The center portions 206a and 206b of the flexible portions 201a and 201b are deflected in the +Z axis direction. The support portions 207a and 207b are located at ends of the flexible portions 201 in the Y axis direction. The support portions 207a and 207b abut the leg portions 302a and 302b. Thus, the flexible portions 201 deflect like a simply supported beam that is simply supported at both ends and subjected to a concentrated load at its center.

"Simply supported" refers to a supporting method having the combination of a pin support and a roller support. Here, it is indicated that the support portions 207a and 207b, which abut the leg portions 302a and 302b, can rotate and move in the longitudinal direction of the flexible portions 201 in accordance with deflection of the flexible portions 201. The support portions 207a and 207b can rotate relative to the leg portions 302a and 302b in accordance with deflection of the flexible portions 201. Also, the support portions 207a and 207b can move in the longitudinal direction of the flexible portions 201 relative to the leg portions 302a and 302b in accordance with deflection of the flexible portions 201. Portions of the support portions 207a and 207b that abut the leg portions 302a and 302b can rotate relative to the leg portions 302a and 302b in accordance with deflection of the flexible portions 201. Also, the portions of the support portions 207a and 207b that abut the leg portions 302a and 302b can move in the longitudinal direction of the flexible portions 201 relative to the leg portions 302a and 302b in accordance with deflection of the flexible portions 201.

The support portions 207a and 207b abut the leg portions 302a and 302b of the projection lens 3. The support portions 207a and 207b are ends in the long edge direction of the flexible portions 201. The support portions 207a and 207b are both ends in the long edge direction of each flexible portion (spring portion) 201. The leg portions 302a and 302b are disposed at the ends in the radial direction of the projection lens 3. The pressing portions 103 of the condensing lens 1 abut center portions in the long edge direction of the flexible portions 201. The center portions 206 are the center portions in the long edge direction of the flexible portions 201. The pressing portions 103 press the center portions 206 toward the projection lens 3. Thus, the pressing portions 103 deflect the flexible portions 201, thereby causing the flexible portions 201 to generate spring force.

The spring member 2 has a spring property. The flexible portions 201 have spring properties. Thus, the flexible portions 201 deform into convex shapes projecting in the +Z axis direction, so that the ends (support portions 207) of the flexible portions 201 in the Y axis direction generate spring forces in the +Z axis direction. Thus, the support portions 207a and 207b press the projection lens 3 in the +Z axis direction. The support portions 207 are the ends in the longitudinal direction of the flexible portions 201.

In the configuration illustrated in FIG. 5B, the support portions 207a and 207b abut the leg portions 302a and 302b of the projection lens 3. In FIG. 5B, the support portions 207a and 207b press the leg portions 302a and 302b of the projection lens 3 in the +Z axis direction.

Thus, the spring forces in the +Z axis direction generated due to the deformation of the spring member 2 act as forces pressing the projection lens 3 in the +Z axis direction.

The projection lens 3 is prevented from moving in the +Z axis direction relative to the holder 4 by abutment of the abutment portions 301 against the abutment portions 404. Thus, the projection lens 3 is held in the holder 4 by the spring forces in the +Z axis direction generated due to the deformation of the spring member 2.

On the other hand, the center portions 206 generate spring forces in the −Z axis direction due to the deformation of the flexible portions 201 into the convex shapes projecting in the +Z axis direction. Thus, the center portions 206 press the condensing lens 1 in the −Z axis direction. The center portions 206 press the condensing lens 1 toward the light emitter 5. The center portions 206 press the condensing lens 1 toward the light source 50.

In the configuration illustrated in FIG. 5B, the center portions 206a and 206b abut the pressing portions 103a and 103b of the condensing lens 1. In FIG. 5B, the center portions 206 press the pressing portions 103 of the condensing lens 1 in the −Z axis direction. The center portions 206 press the pressing portions 103 toward the light emitter 5. The center portions 206 press the pressing portions 103 toward the light source 50.

Thus, the spring forces in the −Z axis direction generated due to the deformation of the spring member 2 act as forces pressing the condensing lens 1 in the −Z axis direction.

The condensing lens 1 abuts the light emitter 5. The light emitter 5 abuts the mounting surface 603 of the heat dissipation unit 6. The mounting surface 603 of the heat dissipation unit 6 abuts the abutment portions 402 of the holder 4. Thus, the condensing lens 1 and light emitter 5 are held on the heat dissipation unit 6 by the spring forces in the −Z axis direction generated due to the deformation of the spring member 2. The condensing lens 1 and light emitter 5 are held on the heat dissipation unit 6 by the spring forces generated due to the deformation of the spring member 2.

According to the first embodiment, it is possible to hold the condensing lens 1, projection lens 3, and light emitter 5 with the spring forces generated due to the deformation of the spring member 2 even under an in-vehicle environment where vibration or heat is applied.

The condensing lens 1 and light emitter 5 are pressed against the heat dissipation unit 6 by the spring force of the spring member 2. The projection lens 3 is also pressed against the holder 4 by the spring force of the spring member 2.

With this configuration, even when vibration is applied, the position of the condensing lens 1 relative to the heat dissipation unit 6 is maintained. The position of the light emitter 5 relative to the heat dissipation unit 6 is also maintained. The position of the projection lens 3 relative to the holder 4 is also maintained.

For example, when the condensing lens 1, projection lens 3, or light emitter 5 is moved, the condensing lens 1, projection lens 3, or light emitter 5 can return to its original position by virtue of the spring force of the spring member 2.

When the dimension in the Z axis direction of the condensing lens 1, projection lens 3, or light emitter 5 changes due to a change in ambient temperature, the amount of deflection of the flexible portions 201 of the spring member 2 changes. Thereby, the dimensional change of the condensing lens 1, projection lens 3, or light emitter 5 in the Z axis direction is absorbed (or compensated) by the flexible portions 201 of the spring member 2. The spring member 2 can absorb (or compensate) a dimensional change of the condensing lens 1 or projection lens 3 due to heat expansion.

Further, no fixing screw or the like is required, which provides advantages, such as reduction in the number of parts, improvement in assemblability, or downsizing of the headlight 100.

Further, the spring member 2 has a simply supported beam structure with free ends on both sides. The spring member 2 has, for example, a plate spring structure extending in the Y axis direction. Thus, the flexible portions 201a and 201b of the spring member 2 can have a length corresponding to the dimension of the projection lens 3 in the Y axis direction. Thus, the amount of change in the spring force with respect to the amount of deflection of the spring member 2 can be reduced. Thus, it is possible to suppress increase in the spring constant of the spring member 2 in accordance with downsizing of the headlight 100. A "spring constant" is obtained by dividing the amount of increase in the load when a spring is loaded, by the amount of the change at this time.

For example, a wave washer is a type of washer and obtained by bending a circular plain washer into a wave shape to provide it with a spring function. When a wave washer is used, the spring constant is large, and a sufficient deflection amount cannot be obtained. When a coil spring is used, it is difficult to reduce the dimension in the axial direction due to design conditions, such as the minimum number of turns or the solid height. Also, to reduce the spring constant, it is necessary to increase the free height of the spring to increase the effective number of turns, and therefore it is difficult to reduce the dimension in the axial direction.

Further, the spring member 2 has a simply supported beam structure with free ends on both sides. The spring member 2 is held so that its ends on both sides are rotatable. In the first embodiment, the ends of the flexible portions 201 are rotatable about the X axis. Thus, it requires no space for fixing the spring member 2 with a screw or the like. This holding method cannot be implemented in the case of a cantilever-shaped spring.

Further, since there is no fixed end, stress concentration on the spring member 2 is less likely to occur when the spring member 2 is deformed. This provides the advantage that the reliability as a part can be improved.

The position where the spring member 2 is disposed is not limited to the above-described position. For example, the spring member 2 may be disposed between the light emitter 5 and the condensing lens 1. The spring member 2 may also be disposed between the projection lens 3 and the holder 4.

However, when the first lens 1 is a condensing lens, it is desirable that the light emitter 5 and condensing lens 1 be accurately positioned relative to each other. Thus, it is desirable that in the optical axis direction (Z axis direction) of the condensing lens 1, the abutment portions 107 of the condensing lens 1 abut the substrate 51 of the light emitter 5, as described above. It is not desirable that the spring member 2 be disposed between the light emitter 5 and the condensing lens 1.

Further, the method of holding the light emitter 5 and condensing lens 1 is not limited to the above-described method. For example, the light emitter 5 may be fixed to the heat dissipation unit 6 using screws or the like. The condensing lens 1 may also be fixed to the heat dissipation unit 6 with screws or the like. The condensing lens 1 may also be fixed to the light emitter 5 with screws or the like.

<First Modification Example>

Figure 6:
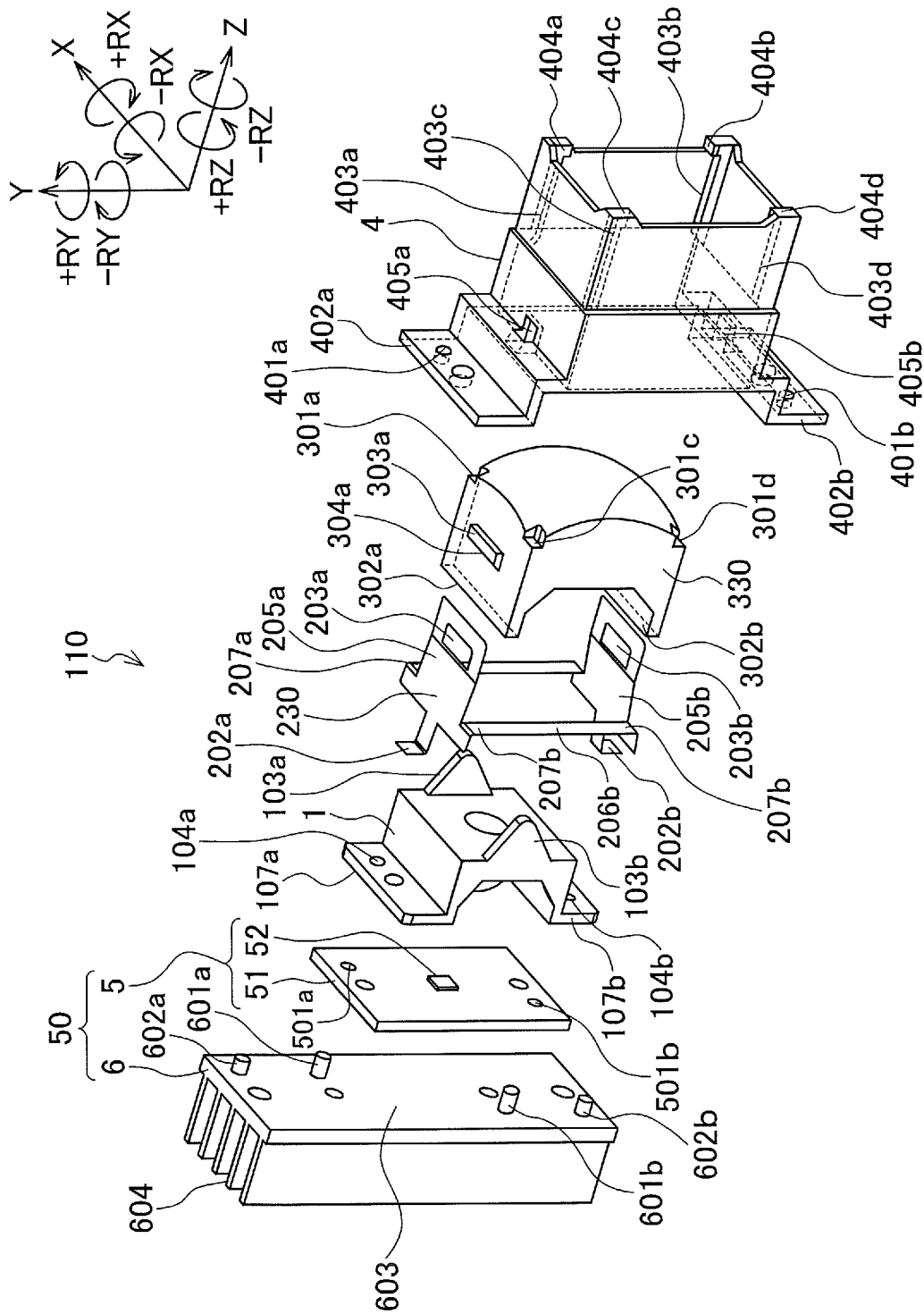
FIG. 6 is a front exploded perspective view of a headlight 110 for explaining an illumination device according to a first modification example.

FIG. 6 is a front exploded perspective view of a headlight 110.

The headlight 110 includes a condensing lens 1, a spring member 230, a projection lens 330, a holder 4, and a light emitter 5. The headlight 110 may include a heat dissipation unit 6. The condensing lens 1, holder 4, light emitter 5, and heat dissipation unit 6 are the same as those of the headlight 100. The condensing lens 1 and light emitter 5 are held on the heat dissipation unit 6 in the same manner as in the headlight 100.

The spring member 230 differs from the spring member 2 in having two holding portions 205a and 205b and holding holes 203a and 203b. Otherwise, the spring member 230 has the same configuration as the spring member 2.

The spring member 230 includes the holding portions 205a and 205b. The holding portions 205 have, for example, plate shapes. As illustrated in FIG. 6, the holding portions 205 are disposed parallel to a Z-X plane. The holding portions 205 have shapes extending from the connecting portions 204 of the spring member 2 in the +Z axis direction. The holding portions 205 are provided to the connecting portions 204. The holding portion 205a is provided on the +Y axis side of the spring member 230. The holding portion 205b is provided on the –Y axis side of the spring member 230.

The holding portions 205 have spring properties. The holding portions 205 can deflect with their ends on the –Z axis side as bases. The ends of the holding portions 205 on the –Z axis side are connected to the connecting portions 204. The holding portions 205 can deflect with the ends connected to the connecting portions 204 as bases. The holding portions 205 can deflect in the Y axis direction.

The holding holes 203 are disposed in the holding portions 205. The holding holes 203 are holes open in the Y axis direction. The holding holes 203 are disposed on the +Z axis sides of the holding portions 205. The holding holes 203 are disposed in flexible portions of the holding portions 205.

The holding hole 203a is disposed in the holding portion 205a. The holding hole 203b is disposed in the holding portion 205b.

The projection lens 330 differs from the projection lens 3 in having two projections 303a and 303b and inclined surfaces 304a and 304b. Otherwise, the projection lens 330 has the same configuration as the projection lens 3.

The projection lens 330 includes the projections 303a and 303b. The projection 303a is disposed on a side surface of the projection lens 330 on the +Y axis side. The projection 303a projects in the +Y axis direction. The projection 303b is disposed on a side surface of the projection lens 330 on the –Y axis side. The projection 303b projects in the –Y axis direction.

The inclined surfaces 304 are disposed on the –Z axis sides of the projections 303. The inclined surfaces 304 are formed in side surfaces of the projections 303 on the –Z axis side. The inclined surfaces 304 are inclined to face outward relative to the side surfaces of the projection lens 330.

The inclined surface 304a is a slope inclined in the +RX direction with respect to an X-Y plane. The inclined surface 304b is a slope inclined in the –RX direction with respect to an X-Y plane.

A method of temporarily assembling the projection lens 330 and holding it in the holder 4 will now be described.

Figure 7A:
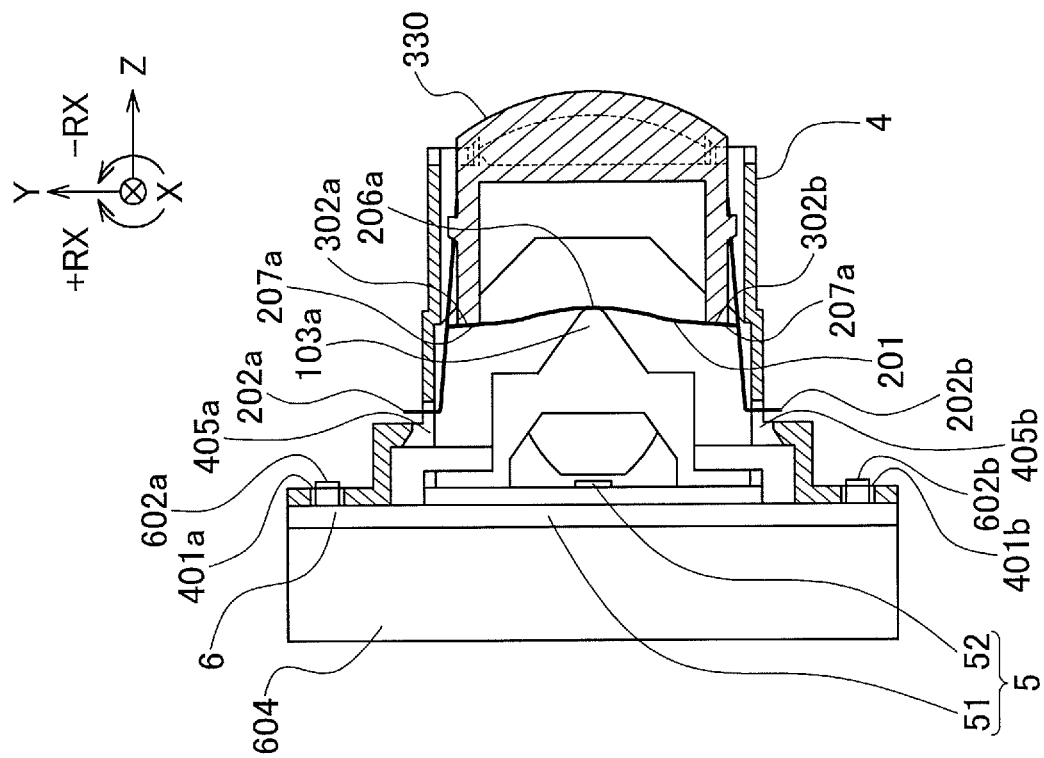
FIGS. 7A and 7B are side half sectional views of the headlight 110 for explaining the illumination device according to the first modification example.
Figure 7B:
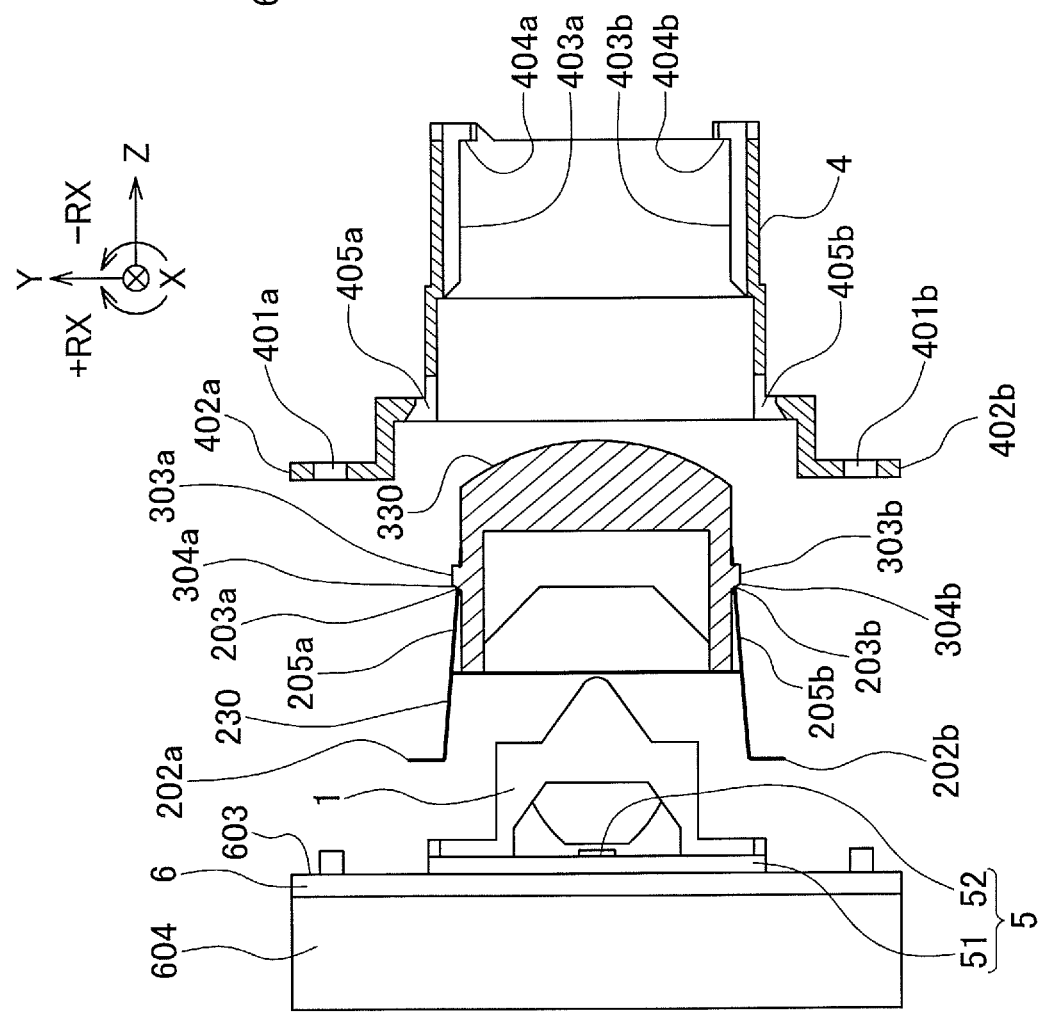

FIGS. 7A and 7B are side sectional views for explaining a method according to the first modification example, of temporarily assembling the projection lens 330 and holding it in the holder 4. FIG. 7A illustrates a state where the spring member 230 is previously mounted to the projection lens 330. FIG. 7B illustrates a state where the projection lens 330 is held in the holder 4.

In an initial state, a distance between the holding portions 205a and 205b of the spring member 230 at the positions of the holding holes 203a and 203b is smaller than a distance between the side surfaces of the projection lens 330 in the Y axis direction. Thus, the holding portions 205a and 205b can sandwich the projection lens 330.

When the spring member 230 is inserted into the projection lens 330 from the –Z axis side of the projection lens 330, ends of the holding portions 205a and 205b on the +Z axis side abut the inclined surfaces 304a and 304b. When the spring member 230 is further inserted into the projection lens 330, a distance between the holding portions 205a and 205b increases. The end of the holding portion 205a on the +Z axis side moves in the +Y axis direction. The end of the holding portion 205b on the +Z axis side moves in the –Y axis direction.

When the spring member 230 is further moved in the +Z axis direction, the projections 303a and 303b enter the holding holes 203a and 203b. The holding portions 205a and 205b deform to sandwich the side surfaces of the projection lens 330. Specifically, the end of the holding portion 205a on the +Z axis side moves in the –Y axis direction. The end of the holding portion 205b on the +Z axis side moves in the +Y axis direction.

Thereby, the spring member 230 is held on the projection lens 330. The spring member 230 is prevented from coming off the projection lens 330.

In the first modification example, the projection lens 330 and spring member 230 can be inserted into the holder 4 while the spring member 230 has been mounted on the projection lens 330. The projection lens 330 and spring member 230 can be handled while they have been partially assembled. "Partially assembled" refers to being partially assembled. It can also be said that the projection lens 330 and spring member 230 are temporarily assembled. "Temporarily assembled" refers to being assembled in consideration of disassembly. Further, the holding of the spring member 230 can prevent the flexible portions 201 from abutting the inner surface of the holder 4.

Further, when the projection lens 330 and spring member 230 are inserted into the holder 4 while they have been partially assembled, the projection lens 330 and spring member 230 can be held in the holder 4, as in the headlight 100.

To assemble the projection lens 330 and spring member 230, it is also possible to provide projection shapes on the holding portions 205a and 205b and provide recesses having concave shapes in the side surfaces of the projection lens 330, for example.

In the first modification example, the projection lens 330 and spring member 230, which are small parts, can be previously assembled before they are mounted to the holder 4. This can improve assemblability.

The method of placing the projection lens 330 in the holder 4 after the projection lens 330 and spring member 230 are inserted in the holder 4 as described above is the same as that in the headlight 100, The state where the projection lens 330 is placed in the holder 4 is the state of FIG. 7B.

<Second Modification Example>

Figure 8:
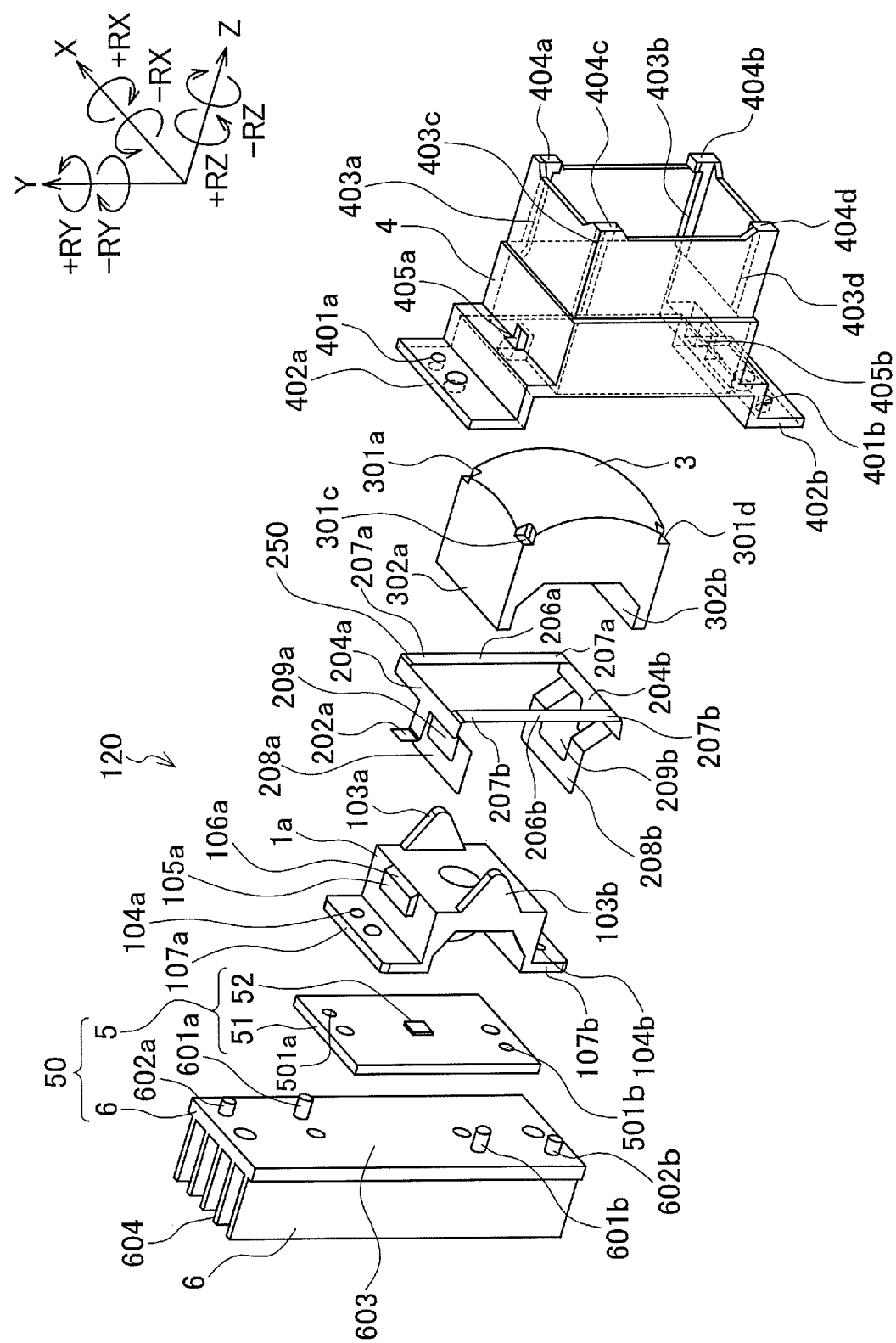
FIG. 8 is a front exploded perspective view of a headlight 120 for explaining an illumination device according to a second modification example.

FIG. 8 is a front exploded perspective view of a headlight 120.

The headlight 120 includes a condensing lens 1a, a spring member 250, a second lens 3, a holder 4, and a light emitter 5. The headlight 120 may include a heat dissipation unit 6. The projection lens 3, holder 4, light emitter 5, and heat dissipation unit 6 have the same configuration as those of the headlight 100. The condensing lens 1a and light emitter 5 are fixed to the heat dissipation unit 6 in the same manner as in the headlight 100.

The condensing lens 1a differs from the condensing lens 1 in having projections 105a and 105b. The projections 105a and 105b have inclined surfaces 106a and 106b. Otherwise, the condensing lens 1a has the same configuration as the condensing lens 1.

The projections 105 are used for temporarily assembling the spring member 250 to the condensing lens 1a.

The projection 105a is disposed on a side surface of the condensing lens 1a on the +Y axis side. The projection 105a projects in the +Y axis direction. The projection 105b is disposed on a side surface of the condensing lens 1a on the −Y axis side. The projection 105b projects in the −Y axis direction.

The inclined surface 106a is formed on the +Z axis side of the projection 105a. The inclined surface 106a is a slope inclined in the −RX direction with respect to an X-Y plane. The inclined surface 106b is formed on the +Z axis side of the fixed projection 105b. The inclined surface 106b is a slope inclined in the +RX direction with respect to an X-Y plane. The inclined surfaces 106 are inclined to face outward relative to the side surfaces of the condensing lens 1a.

The spring member 250 differs from the spring member 2 in having holding portions 208a and 208b. The holding portions 208a and 208b have holding holes 209a and 209bOtherwise, the spring member 250 has the same configuration as the spring member 2.

The holding portions 208 are used for, for example, temporarily assembling the spring member 250 to the condensing lens 1a.

The spring member 250 includes the holding portions 208a and 208b. The holding portions 208 have, for example, plate shapes. As illustrated in FIG. 8, the holding portions 208 are disposed parallel to a Z-X plane. The holding portions 208 extend in the −Z axis direction from the connecting portions 204. The holding portions 208 are connected to the connecting portions 204. The holding portion 208a is provided on the +Y axis side of the spring member 250. The holding portion 208b is provided on the −Y axis side of the spring member 250.

The holding portions 208 have spring properties. The holding portions 208 can deflect with the connecting portions 204 as bases. The holding portions 208 can deflect with their ends connected to the connecting portions 204 as bases. The holding portions 208 can deflect in the Y axis direction.

The holding holes 209 are disposed in the holding portions 208. The holding holes 209 are holes open in the Y axis direction. The holding holes 203 are disposed in flexible portions of the holding portions 208.

The holding hole 209a is disposed in the holding portion 208a. The holding hole 209b is disposed in the holding portion 208b.

A method of temporarily assembling the condensing lens 1a and holding the projection lens 330 in the holder 4.

FIGS. 9A and 9B are side sectional views for explaining a method, according to a second modification example, of temporarily assembling the condensing lens 1a and holding the projection lens 330 in the holder 4. FIG. 9A illustrates a state where the spring member 250 is previously mounted to the condensing lens 1a FIG. 9B illustrates a state where the projection lens 3 is held in the holder 4.

In an initial state, a distance between the holding portions 208a and 208b of the spring member 250 at the positions of the holding holes 209a and 209b is smaller than a distance between the side surfaces of the condensing lens 1a in the Y axis direction. Thus, the holding portions 208a and 208b can sandwich the condensing lens 1a.

When the spring member 250 is inserted into the condensing lens 1a from the +Z axis side of the condensing lens 1a, ends of the holding portions 208a and 208b on the −Z axis side abut the inclined surfaces 106a and 106b. When the spring member 250 is further inserted into the condensing lens 1a, a distance between the holding portions 208a and 208b increases. The end of the holding portion 208a on the −Z axis side moves in the +Y axis direction. The end of the holding portion 208b on the −Z axis side moves in the −Y axis direction.

When the spring member 250 is further moved in the −Z axis direction, the projections 105a and 105b enter the holding holes 209a and 209b. The holding portions 208a and 208b deform to sandwich the side surfaces of the condensing lens 1a. The end of the holding portion 208a on the −Z axis side moves in the −Y axis direction. The end of the holding portion 208b on the −Z axis side moves in the +Y axis direction.

Thereby, the spring member 250 is held on the condensing lens 1a. The spring member 250 is prevented from coming off the condensing lens 1a.

In the second modification example, it is possible to hold the projection lens 3 in the holder 4 while the spring member 250 has been mounted to the condensing lens 1a. The condensing lens 1a and spring member 250 can be handled while they have been partially assembled. It can also be said that the condensing lens 1a and spring member 250 are temporarily assembled.

The projection lens 3 is placed in the holder 4. Also, while the condensing lens 1a and spring member 250 have been partially assembled, the light source unit 55 is assembled by mounting the condensing lens 1a and light emitter 5 to the heat dissipation unit 6.

The projection lens 3 can be held in the holder 4 by inserting the light source unit 55 into the holder 4 from the −Z axis direction, as in the headlight 100.

To assemble the condensing lens 1a and spring member 250, it is also possible to provide projection shapes on the holding portions 208a and 208b and provide recesses having concave shapes in the side surfaces of the condensing lens 1a, for example.

In the second modification example, the condensing lens 1a and spring member 250, which are small parts, can be previously assembled before they are mounted to the holder 4. This can improve assemblability.

Further, while the spring member 250 has been mounted to the condensing lens 1a, they are inserted into the holder 4. Then, the hook portions 202a and 202b are hooked in the holes 405a and 405b of the holder 4, as in the headlight 100. Thus, the projection lens 3 is temporarily assembled to the holder 4.

By slightly moving the condensing lens 1a in the −Y axis direction relative to the spring member 250 and rotating the condensing lens 1a in the −RX direction, it is possible to cause the projection 105a to move out of the hole 209a. Also, by slightly moving the condensing lens 1a in the +Y axis direction relative to the spring member 250 and slightly rotating the condensing lens 1a in the +RX direction, it is possible to cause the projection 105b to move out of the hole 209b. Thus, it is possible to release the engagement of the holding portions 208 with the projections 105.

Thus, it is possible to take the condensing lens 1a off the spring member 250 while the projection lens 3 has been temporarily assembled to the holder 4. It is possible to take the light source unit 55 off the holder 4 while the spring member 250 and projection lens 3 have been temporarily assembled to the holder 4. This can prevent the projection lens 3 from dropping off the holder 4 during replacement of the light emitter 5, or the like. This improves workability during assembly or part replacement.

<Third Modification Example>

Figure 10:
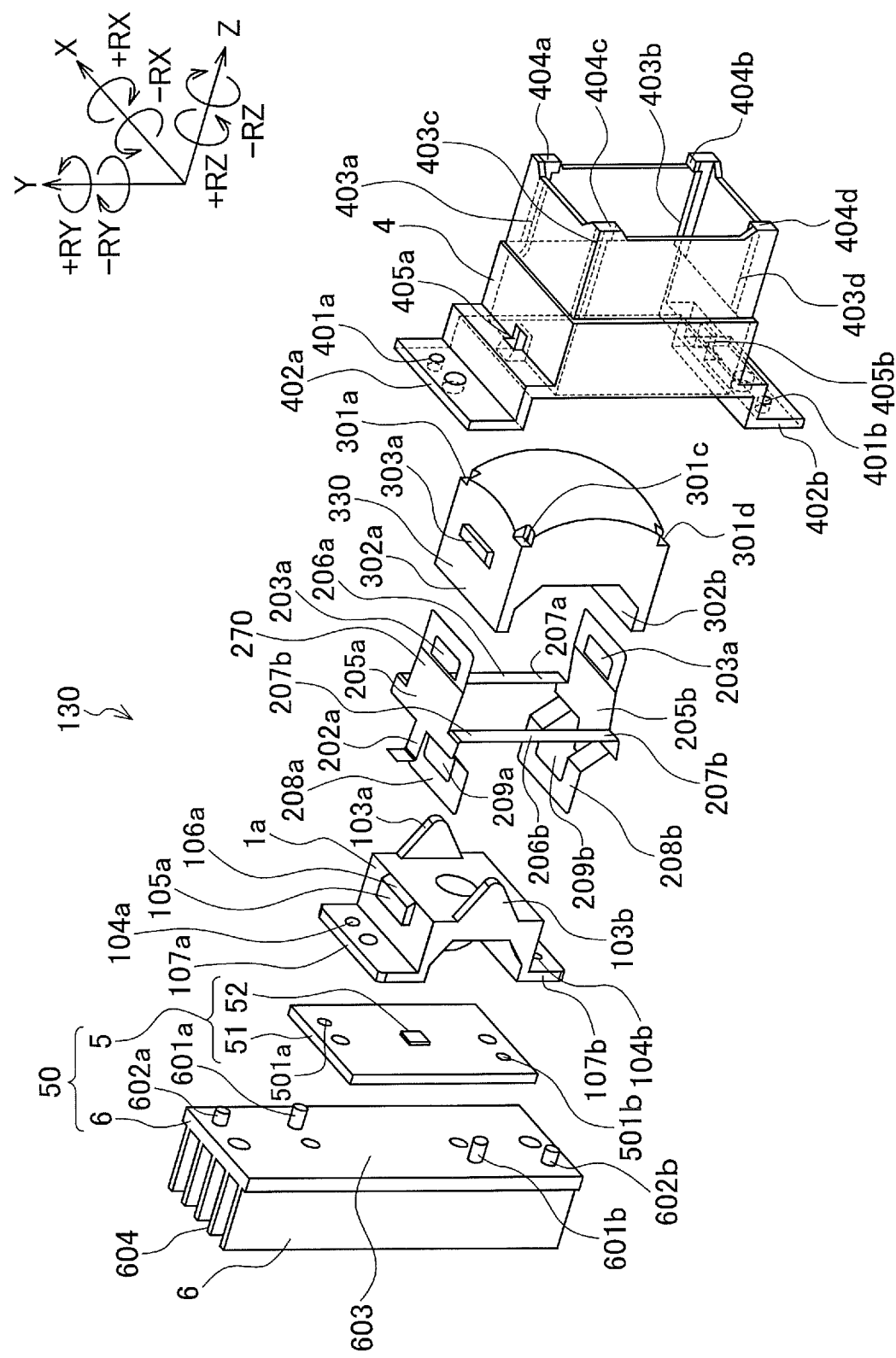
FIG. 10 is a front exploded perspective view of a headlight 130 for explaining an illumination device according to a third modification example.

FIG. 10 is a front exploded perspective view of a headlight 130.

The headlight 130 includes a condensing lens 1a, a spring member 270, a projection lens 330, a holder 4, and a light emitter 5. The headlight 130 may include a heat dissipation unit 6. The condensing lens 1a has the same configuration as that of the headlight 120. The projection lens 330 has the same configuration as that of the headlight 110. The holder 4, light emitter 5, and heat dissipation unit 6 have the same configurations as those of the headlight 100. The spring member 270 includes the holding portions 205 and holding holes 203 of the headlight 110. The spring member 270 also includes the holding portions 208 and holding holes 209 of the headlight 120. The spring member 270 has a shape obtained by combining the spring members 230 and 250.

The spring member 270 is mounted to the projection lens 330 in the same manner as in the headlight 110 of the first modification example. The spring member 270 is also mounted to the condensing lens 1a in the same manner as in the headlight 120 of the second modification example. In the third modification example, the partial assembly is performed by a method obtained by combining the first modification example and second modification example.

Next, the temporary assembly of the condensing lens 1a and projection lens 330 will be described. A method of holding the projection lens 330 in the holder 4 will also be described.

Figure 11A:
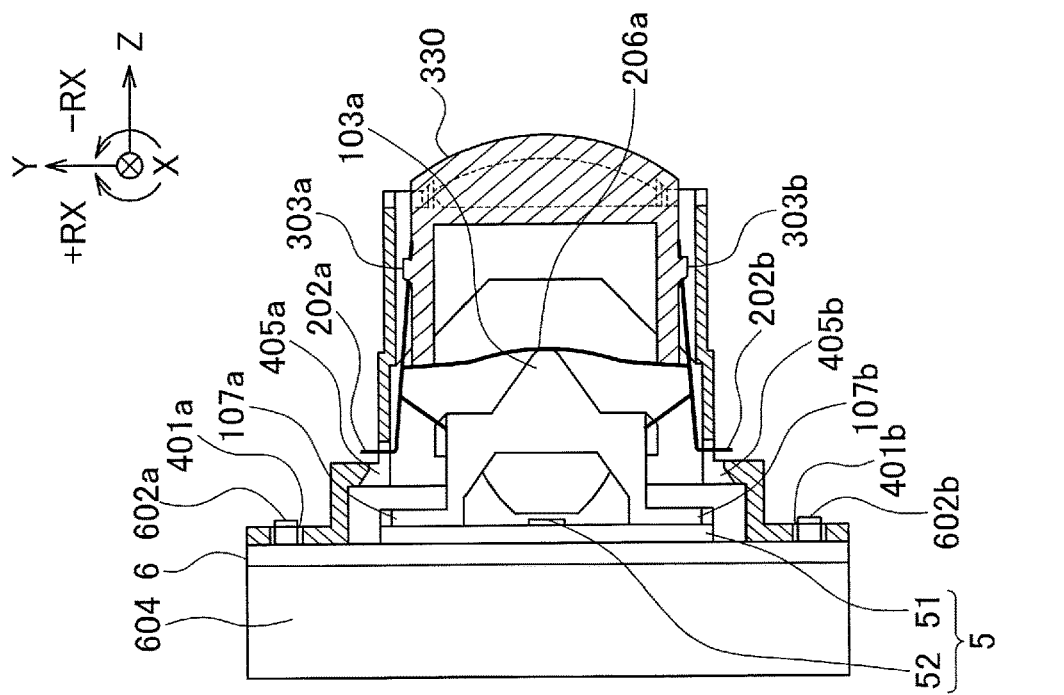
FIGS. 11A and 11B are side half sectional views of the headlight 130 for explaining the illumination device according to the third modification example.
Figure 11B:
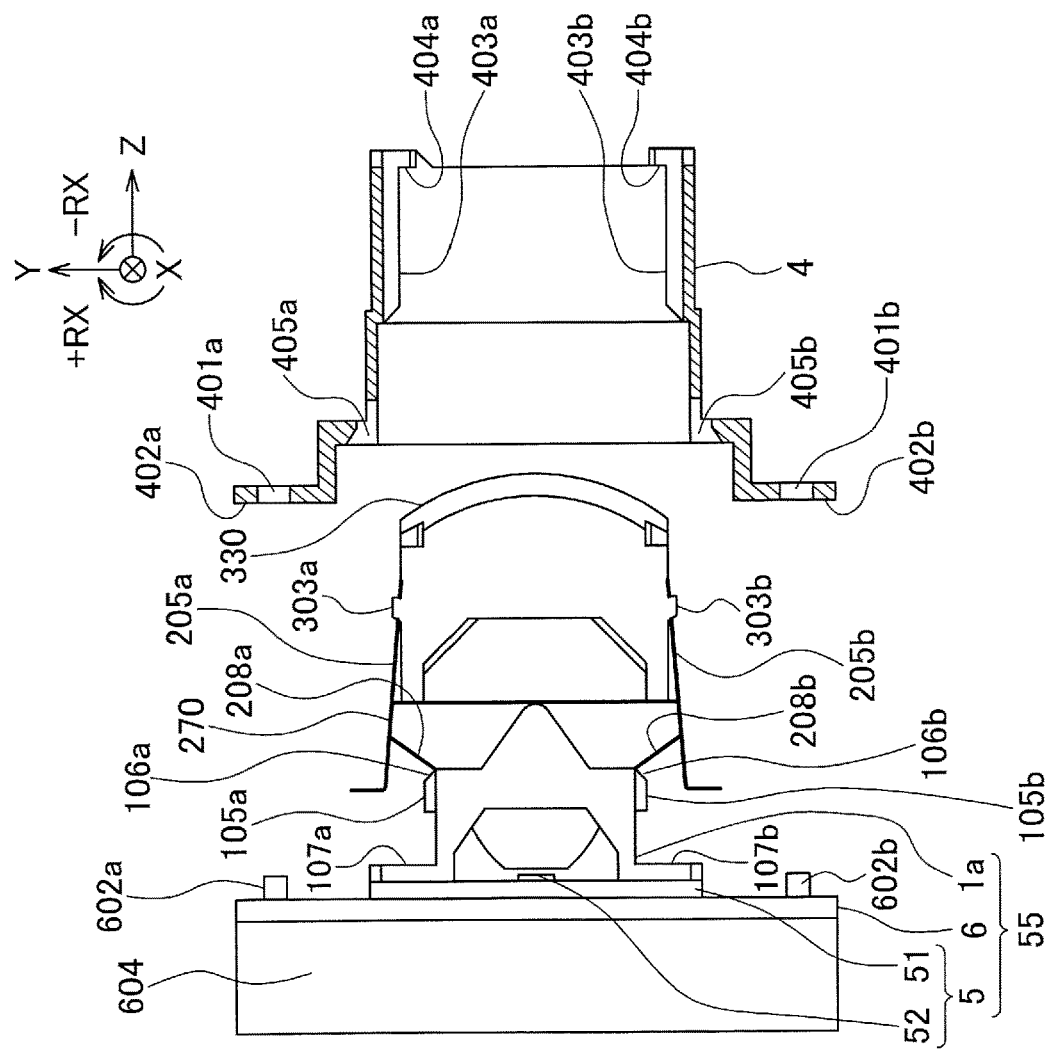

FIGS. 11A and 11B are side half sectional views for explaining a method, according to a third modification example, of mounting the projection lens 330 to the condensing, lens 1a using the spring member 270. FIGS. 11A and 11B are also side half sectional views for explaining a method of holding the projection lens 330 in the holder 4. FIGS. 11A and 11B are side half sectional views for explaining a method of holding the projection lens 330 in the holder 4.

FIG. 11A illustrates a state where the projection lens 330 is temporarily assembled to the condensing lens 1a through the spring member 270. FIG. 11B illustrates a state where the projection lens 330 is held in the holder 4.

The projection lens 330 is partially assembled to the spring member 270 in the same manner as described in the first modification example. Also, the condensing lens 1a is partially assembled to the spring member 270 in the same manner as described in the second modification example. In the third modification example, the projection lens 330 is mounted to the light source unit 55 through the spring member 270. The light source unit 55 includes the heat dissipation unit 6, light emitter 5, and condensing lens 1a.

In FIG. 11A, the projection lens 330 is mounted to the light source unit 55 through the spring member 270. Thus, it is possible to previously assemble the parts before mounting them to the holder 4. This partial assembly improves assemblability.

While the heat dissipation unit 6, light emitter 5, condensing lens 1a, spring member 270, and projection lens 330 have been partially assembled, the projection lens 330 is inserted into the holder 4. Then, the hook portions 202 are inserted into the holes 405. Then, the holder 4 is fixed to the heat dissipation unit 6 with screws or the like.

The condensing lens 1a and light emitter 5 have the positioning holes at the same positions. The positioning pins 601a and 601b of the heat dissipation unit 6 pass through the positioning holes 501a and 501b of the light emitter 5 and the positioning holes 104a and 104b of the condensing lens 1a. Also, the positioning pins 602a and 602b of the heat dissipation unit 6 are inserted in the positioning holes 401a and 401b of the holder 4.

The heat dissipation unit 6 is held on the holder 4 with the light emitter 5 and condensing lens 1a therebetween. Thus, it is possible to eliminate the process (work) of mounting the condensing lens 1a and light emitter 5 to the holder 4. Also, the accuracy of positioning of the condensing lens 1a and light emitter 5 relative to the holder 4 improves.

<Fourth Modification Example>

FIG. 12 is a front exploded perspective view of a headlight 140.

The headlight 140 includes a condensing lens 1b, a spring member 2, a projection lens 350, a holder 4, and a light emitter 5. The headlight 140 may include a heat dissipation unit 6.

In the fourth modification example, the condensing lens 1b differs in shape from the condensing lens 1. The projection lens 350 differs from the projection lens 3. The spring member 2, holder 4, light emitter 5, and heat dissipation unit 6 are the same as those of the headlight 100. The condensing lens 1b and light emitter 5 are held on the heat dissipation unit 6 in the same manner as in the headlight 100.

The condensing lens 1b includes leg portions 161a and 161b. The condensing lens 1b includes the two leg portions 161a and 161b. The condensing lens 1b does not include the pressing portions 103a and 103b. The condensing lens 1b differs from the condensing lens 1 in these points. Otherwise, the condensing lens 1b has the same configuration as the condensing lens 1.

The leg portions 161a and 161b are disposed on the emitting surface side (+Z axis side) of the condensing lens 1b. The leg portions 161a and 161b are disposed outside a region through which light is emitted from the emitting surface side of the condensing lens 1b.

In FIG. 12, the leg portions 161a and 161b are disposed on sides of the condensing lens 1b in the Y axis direction. The leg portions 161a and 161b are disposed at ends of the condensing lens 1b in the Y axis direction. The leg portion 161a is disposed on the +Y axis side of the condensing lens 1b. The leg portion 161b is disposed on the −Y axis side of the condensing lens 1b. The leg portions 161 are supporting portions that support both ends (support portions 207) in the long edge direction of each of the flexible portions (spring portions) 201. The leg portions 161 are disposed at ends in a radial direction of the condensing lens 1b.

For example, in the Z axis direction, the leg portions 161a and 161b project in the +Z axis direction from the position of the lens of the condensing lens 1b. In FIG. 12, the leg portions 161*a* and 161*b* have, for example, plate shapes. In FIG. 12, the leg portions 161*a* and 161*b* have plate shapes parallel to a Z-X plane.

The leg portions 161*a* and 161*b* have, for example, rectangular shapes as viewed in the Y axis direction. Ends of the leg portions 161*a* and 161*b* on the +Z axis side are parallel to the X axis.

The ends of the leg portions 161*a* and 161*b* on the +Z axis side abut the support portions 207*a* and 207*b* of the spring member 2.

The projection lens 350 includes pressing portions 351*a* and 351*b*. The projection lens 350 includes the two pressing portions 351*a* and 351*b*. The projection lens 350 does not include the leg portions 302*a* and 302*b*. The projection lens 350 differs from the projection lens 3 in these points. Otherwise, the projection lens 350 has the same configuration as the projection lens 3.

The pressing portions 351*a* and 351*b* are disposed on the incident surface side (−Z axis side) of the projection lens 350. The pressing portions 351*a* and 351*b* are disposed outside a region through which light is incident on the incident surface side of the projection lens 350.

In FIG. 12, the pressing portions 351*a* and 351*b* are disposed on sides of the projection lens 350 in the X axis direction. The pressing portions 351*a* and 351*b* are disposed at ends of the projection lens 350 in the X axis direction. The pressing portion 351*a* is disposed on the +X axis side of the projection lens 350. The pressing portion 351*b* is disposed on the −X axis side of the projection lens 350.

The pressing portions 351*a* and 351*b* project in the −Z axis direction from the position of the lens of the projection lens 350, for example. In FIG. 12, the pressing portions 351*a* and 351*b* have, for example, plate shapes. In FIG. 12, the pressing portions 351*a* and 351*b* have plate shapes parallel to a Y-Z plane.

The pressing portions 351*a* and 351*b* have, for example, convex shapes as viewed in the X axis direction. In FIG. 12, the pressing portions 351*a* and 351*b* have triangular shapes as viewed in the X axis direction. Ends of the pressing portions 351*a* and 351*b* on the −Z axis side correspond to vertexes of the triangular shapes.

The ends of the pressing portions 351*a* and 351*b* on the −Z axis side abut the center portions 206*a* and 206*b* of the spring member 2.

FIGS. 13A and 13B are side sectional views for explaining a method, in a fourth modification example, of temporarily assembling the projection lens 350 and holding it in the holder 4. FIG. 13A illustrates a state where the projection lens 350 is temporarily assembled to the holder 4 with the spring member 2. FIG. 13B illustrates a state where a unit (light source unit 55) obtained by mounting the condensing lens 1*b* and light emitter 5 to the heat dissipation unit 6 is placed in the holder 4.

As illustrated in FIG. 13A, the state where the projection lens 350 is temporarily assembled to the holder 4 with the spring member 2 is the same as the state of FIG. 4A described in the headlight 100.

As illustrated in FIG. 13B, a method of fixing the projection lens 350 with the spring member 2 differs from the method that is illustrated in FIG. 5B and described in the headlight 100. The pressing portions 103*a* and 103*b* provided in the condensing lens 1 and the leg portions 302*a* and 302*b* provided in the projection lens 3 are replaced with each other.

The ends of the leg portions 161*a* and 161*b* on the +Z axis side abut the support portions 207*a* and 207*b* of the spring member 2. The ends of the pressing portions 351*a* and 351*b* on the −Z axis side abut the center portions 206*a* and 206*b* of the spring member 2.

The pressing portions 351 press the center portions 206 of the flexible portions 201 in the Y axis direction, in the −Z axis direction. The flexible portions 201 are pressed by the pressing portions 351 into convex shapes projecting in the −Z axis direction. The center portions 206*a* and 206*b* of the flexible portions 201*a* and 201*b* are deflected in the −Z axis direction.

Similarly to the headlight 100, the headlight 140 can hold the projection lens 350 in the holder 4 through spring force obtained by deformation of the spring member 2. Also, the headlight 140 can hold the condensing lens 1*b* on the light emitter 5 through spring force obtained by deformation of the spring member 2. The headlight 140 can hold the condensing lens 1*b* on the light source 50 through spring force obtained by deformation of the spring member 2.

In the case of the headlight 140, the first lens 1*b* is, for example, a condensing lens that forms a light distribution pattern (first light distribution pattern). The second lens 350 is a projection lens that projects the light distribution pattern (first light distribution pattern) in the forward direction.

In this case, a lens diameter of the second lens (projection lens) 350 is larger than a lens diameter of the first lens (condensing lens) 1*b*. Thus, it is more preferable that the second lens (projection lens) 3 include the leg portions 302 and the first lens (condensing lens) 1 include the pressing portions 103, as in the headlight 100 illustrated in FIG. 1, for example.

This is because the large lens abuts both ends (the support portions 207) of each flexible portion 201 and the small lens abuts the center portions 206 of the flexible portions 201, which allows the structure to be downsized. The leg portions 302 abut the support portions 207 of the spring member 2. The pressing portions 103 abut the center portions 206 of the spring member 2.

When the projected light distribution pattern has a rectangular shape long in one direction, like, e.g., a low beam of a headlight, it is preferable that the flexible portions 201 be disposed parallel to the direction (X axis direction) in which the light distribution pattern is long.

This is because, in some cases, the second lens (projection lens) 3 is cut parallel to the direction (Y axis direction) in which the light distribution pattern is long, as illustrated in FIG. 1. By disposing the flexible portions 201 parallel to the direction (X axis direction) in which the light distribution pattern is long, it is possible to lengthen the flexible portions 201.

In the above-described embodiment and modification examples, the second lens (projection lens) 3 is cut in the Y axis direction. Specifically, cut surfaces of the second lens (projection lens) 3 are parallel to a Y-Z plane.

<Fifth Modification Example>

Figure 14:
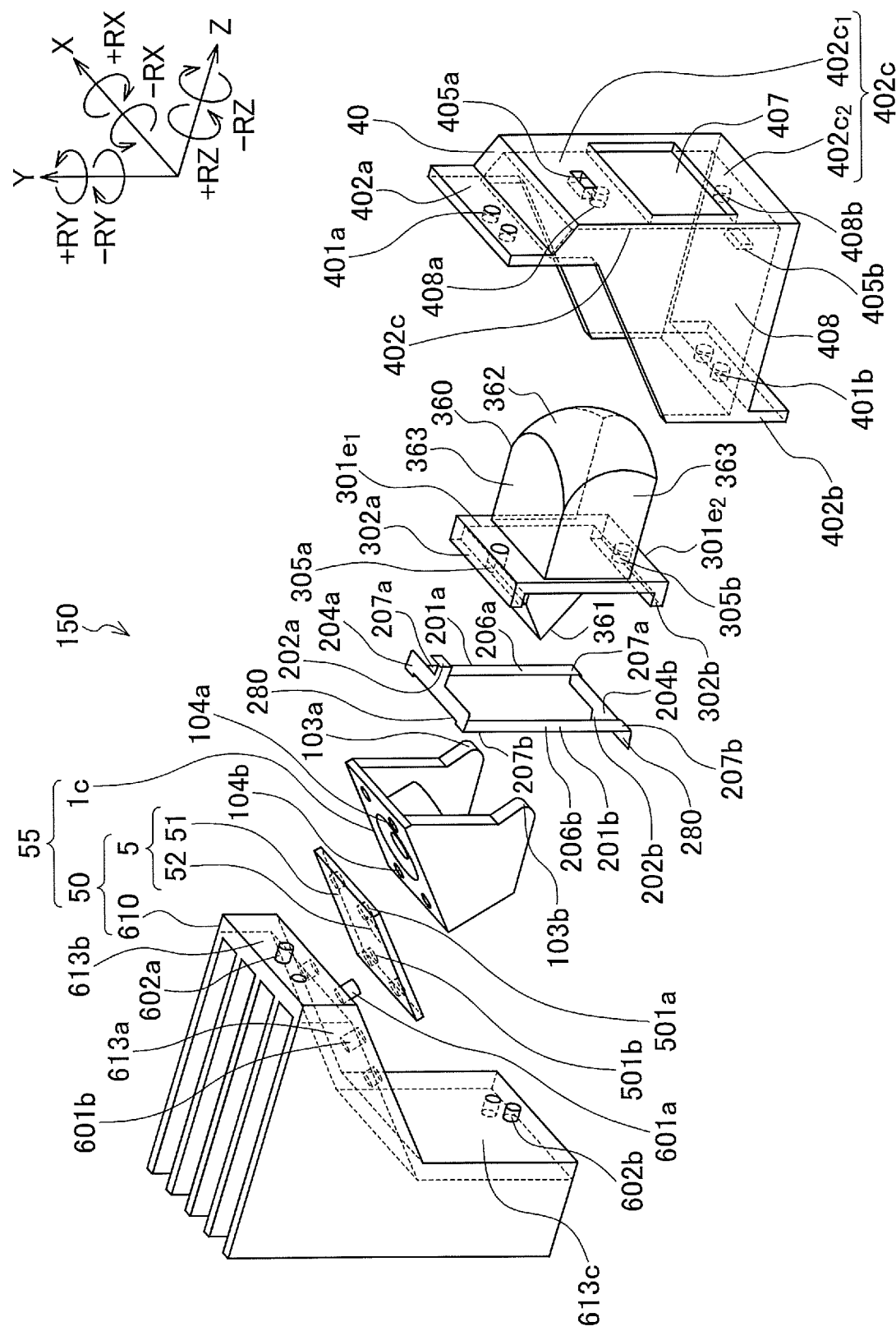
FIG. 14 is a front exploded perspective view of a headlight 150 for explaining an illumination device according to a fifth modification example.

FIG. 14 is a front exploded perspective view of a headlight 150 according to a fifth modification example.

The headlight 150 forms a first light distribution pattern. The headlight 150 then projects the first light distribution pattern to form a second light distribution pattern. The second light distribution pattern is formed in the forward direction (+Z axis direction) from the headlight 150. The headlight 150 is, for example, a passing headlight (low beam).

The headlight 150 includes a condensing lens 1*c*, a spring member 280, a projection optical element 360, a holder 40, and a light emitter 5. The headlight 150 may include a heat dissipation unit 610. The light emitter 5 is the same as that of the headlight 100. A configuration for holding the condensing lens 1c and light emitter 5 on the heat dissipation unit 610 is the same as that of the headlight 100. However, the condensing lens 1c and light emitter 5 are held on the heat dissipation unit 610 such that they are inclined in the +RX direction.

A light source 50 includes the light emitter 5 and heat dissipation unit 610.

The light emitter 5 is the same as the light emitter 5 described in the headlight 100, so description thereof will be omitted.

The heat dissipation unit 610 differs in shape from the heat dissipation unit 6. A mounting surface 613 of the heat dissipation unit 610 includes mounting surfaces 613a, 613b, and 613c. The heat dissipation unit 610 includes positioning pins 601a, 601b, 602a, and 602b.

The mounting surface 613a is a surface that abuts the light emitter 5. The mounting surface 613a is a surface that abuts the substrate 51. For example, the substrate 51 is mounted on the mounting surface 613a.

The mounting surface 613a differs from that of the of the heat dissipation unit 6 in that it is inclined in the +RX direction with respect to an X-Y plane. The mounting surface 613a is inclined in the +RX direction with respect to an X-Y plane. The mounting surface 613a is formed, for example, on the +Z axis side of the heat dissipation unit 610.

The positioning pins 601a and 601b are disposed on the mounting surface 613a. The positioning pins 601a and 601b are shafts perpendicular to the mounting surface 613a. The positioning pin 601a is inserted in the positioning hole 501a in the substrate 51. The positioning pin 601b is inserted in the positioning hole 501b in the substrate 51. The substrate 51 is positioned on the heat dissipation unit 610 by the positioning pins 601a and 601b and positioning holes 501a and 501b.

The mounting surface 613b is a surface that abuts an abutment portion 402a of the holder 40. The abutment portion 402a of the holder 40 is mounted to the mounting surface 613b.

The mounting surface 613b is disposed on the +Y axis side of the mounting surface 613a. The mounting surface 613b is, for example, a surface parallel to an X-Y plane. An end of the mounting surface 613b on the -Y axis side is connected to an end of the mounting surface 613a on the +Y axis side.

The positioning pin 602a is disposed on the mounting surface 613b. The positioning pin 602a is, for example, a shaft perpendicular to the mounting surface 613b. The positioning pin 602a is inserted in a positioning hole 401a in the abutment portion 402a of the holder 40.

The mounting surface 613c is a surface that abuts an abutment portion 402b of the holder 40. The abutment portion 402b of the holder 40 is mounted to the mounting surface 613c.

The mounting surface 613c is disposed on the -Y axis side of the mounting surface 613a. The mounting surface 613c is, for example, a surface parallel to an X-Y plane. An end of the mounting surface 613c on the +Y axis side is connected to an end of the mounting surface 613a on the -Y axis side. The mounting surface 613c is located on the -Z axis side of the mounting surface 613b.

The positioning pin 602b is disposed on the mounting surface 613c. The positioning pin 602b is, for example, a shaft perpendicular to the mounting surface 613c. The positioning pin 602b is inserted in a positioning hole 401b in the abutment portion 402b of the holder 40. The holder 40 is positioned on the heat dissipation unit 610 by the positioning pins 602a and 602b and the positioning holes 401a and 401b.

The condensing lens 1c concentrates light emitted from the light emitting element 52. The condensing lens 1c is mounted to the substrate 51. The condensing lens 1c is mounted to the heat dissipation unit 610 through the substrate 51. The condensing lens 1c is mounted to the mounting surface 613a. Thus, an optical axis of the condensing lens 1c is inclined in the +RX direction with respect to the Z axis.

The condensing lens 1c includes pressing portions 103a and 103b. The pressing portions 103a and 103b are disposed with the optical axis of the condensing lens 1c therebetween. The pressing portion 103a is disposed on the +X axis side of the condensing lens 1c. The pressing portion 103b is disposed on the -X axis side of the condensing lens 1c.

The spring member 280 differs from the spring member 2 in that a connecting portion 204a is disposed on the +Z axis side of flexible portions 201. The connecting portion 204a is a connecting portion 204 on the +Y axis side. Otherwise, the spring member 280 has the same configuration as the spring member 2.

The headlight 150 includes the projection optical element 360 instead of the projection lens 3. The projection optical element 360 includes a reflecting surface 361 and an emitting surface 362. A light guide portion 363 is formed between the reflecting surface 361 and the emitting surface 362.

The reflecting surface 361 reflects light emitted from the condensing lens 1c. The reflecting surface 361 forms a light distribution pattern (first light distribution pattern). The reflecting surface 361 forms a cutoff line in the light distribution pattern, for example. The reflecting surface 361 forms the cutoff line by reflecting light emitted from the condensing lens 1c.

The emitting surface 362 has positive refractive power. Refractive power is also referred to as power. The emitting surface 362 projects the light distribution pattern (first light distribution pattern) formed by the reflecting surface 361. The emitting surface 362 projects the light distribution pattern, which is formed on a plane including a focal point of the emitting surface 362 and being perpendicular to an optical axis of the emitting surface 362. Here, the optical axis of the emitting surface 362 is parallel to the Z axis. The projection optical element 360 emits, from the emitting surface 362, light emitted from the condensing lens 1c.

The projection optical element 360 is disposed in the forward direction (+Z axis direction) from the condensing lens 1c.

The projection optical element 360 has, for example, a rectangular shape as viewed from the front (+Z axis side).

The projection optical element 360 includes leg portions 302a and 302b. In FIG. 14, the leg portions 302a and 302b are disposed between the reflecting surface 361 and the emitting surface 362.

The leg portions 302a and 302b are disposed, for example, on the +Y axis side and -Y axis side of the projection optical element 360. The leg portion 302a is disposed on the +Y axis side of the projection optical element 360. The leg portion 302b is disposed on the -Y axis side of the projection optical element.

However, for example, when the headlight 150 projects a horizontally long light distribution pattern, the leg portions 302a and 302b may be disposed on the +X axis side and -X axis side of the projection optical element 360. The "horizontally long light distribution pattern" is a light distribution pattern that is longer in the horizontal direction (X axis direction) than in the vertical direction (Y axis direction). In the case of the horizontally long light distribution pattern, the dimension of the projection optical element 360 in the horizontal direction (X axis direction) is larger than the dimension in the vertical direction (Y axis direction). The flexible portions 201a and 201b of the spring member 280 are disposed parallel to the horizontal direction (X axis direction). Thus, it is possible to lengthen the flexible portions 201a and 201b of the spring member 2.

The leg portions 302a and 302b project toward the −Z axis side of the projection optical element 360. The leg portions 302a and 302b have, for example, plate shapes. In FIG. 14, the leg portions 302a and 302b have plate shapes parallel to a Z-X plane.

The projection optical element 360 includes abutment portions 301e. The abutment portions 301e are, for example, surfaces that are disposed on the outer periphery of the projection optical element 360 and face toward the emitting surface 362 (+Z axis side). "Abutment" refers to touching and being in contact with a portion.

The abutment portions 301e may be disposed on the upper and lower sides or the left and right sides of the projection optical element 360. In FIG. 14, the abutment portions 301e are disposed on the upper and lower sides of the projection optical element 360.

The projection optical element 360 includes positioning holes 305a and 305b. The positioning holes 305a and 305b are disposed, for example, in the abutment portions 301e. The positioning holes 305a and 305b are holes perpendicular to abutment surfaces of the abutment portions 301e. The positioning holes 305a and 305b are, for example, holes parallel to the Z axis.

The holder 40 holds the projection optical element 360. The holder 40 has a function of a lens barrel.

The holder 40 includes the abutment portions 402a and 402b. The abutment portions 402a and 402b are portions that abut the heat dissipation unit 6. The abutment portions 402a and 402b abut the mounting surfaces 613b and 613c of the heat dissipation unit 610. The abutment portion 402a abuts the mounting surface 613b of the heat dissipation unit 610. The abutment portion 402b abuts the mounting surface 613c of the heat dissipation unit 610.

In FIG. 14, the abutment portions 402a and 402b are disposed on the −Z axis side of the holder 40. Contact surfaces of the abutment portions 402a and 402b are surfaces parallel to an X-Y plane.

The abutment portions 402a and 402b have, for example, flange shapes projecting toward the +Y axis side and −Y axis side of the projection optical element 360. The abutment portion 402a has a flange shape projecting toward the +Y axis side. The abutment portion 402b has a flange shape projecting toward the −Y axis side.

The mounting surfaces 613b and 613c of the heat dissipation unit 610 abut the contact surfaces of the abutment portions 402a and 402b. Thereby, the holder 40 is positioned relative to the heat dissipation unit 610 in the Z axis direction. The Z axis direction is, for example, a direction of the optical axis of the projection optical element 360.

The holder 40 has the positioning holes 401a and 401b. The positioning holes 401a and 401b are holes perpendicular to the contact surfaces of the abutment portions 402a and 402b. The positioning holes 401a and 401b are, for example, holes parallel to the Z axis. The positioning holes 401a and 401b are disposed in the abutment portions 402a and 402b.

The positioning hole 401a is disposed in the abutment portion 402a. The positioning hole 401b is disposed in the abutment portion 402b.

The positioning pins 602a and 602b of the heat dissipation unit 610 are inserted in the positioning holes 401a and 401b of the holder 40. The positioning pin 602a is inserted in the positioning hole 401a. The positioning pin 602b is inserted in the positioning hole 401b. Thus, the holder 40 is positioned relative to the heat dissipation unit 610.

The positioning pins 602a and 602b of the heat dissipation unit 610 are inserted in the positioning holes 401a and 401b of the holder 40. Thereby, the holder 40 is positioned in an X-Y plane relative to the heat dissipation unit 610. The holder 40 is positioned relative to the heat dissipation unit 610 in a plane perpendicular to the optical axis of the projection optical element 360.

The holder 40 includes an abutment portion 402c. The abutment portion 402c is an inner surface of the holder 40 facing in the −Z axis direction.

The abutment portion 402c includes abutment portions $402c_1$ and $402c_2$. The abutment portion $402c_1$ is located on the +Y axis side of an opening 407. The abutment portion $402c_2$ is located on the −Y axis side of the opening 407.

Surfaces of the abutment portions 301e of the projection optical element 360 on the +Z axis side abut the abutment portion 402c. Thereby, the projection optical element 360 is positioned relative to the holder 40 in the Z axis direction.

The projection optical element 360 is inserted from the −Z axis side of the holder 40. The projection optical element 360 is inserted into the holder 40 in the +Z axis direction. The projection optical element 360 is inserted into the holder 40 from the −Z axis side. The abutment portions 301e of the projection optical element 360 abut the abutment portion 402c.

The abutment of the abutment portions 301e against the abutment portion 402c positions the projection optical element 360 relative to the holder 40. The abutment portion 402c positions the projection optical element 360 relative to the holder 40 in the optical axis direction (Z axis direction).

The holder 40 includes positioning pins 408a and 408b. The positioning pins 408a and 408b are disposed on a surface of the abutment portion 402c. The positioning pin 408a is disposed on the abutment portion $402c_1$. The positioning pin 408b is disposed on the abutment portion $402c_2$.

The positioning pins 408a and 408b are shafts perpendicular to contact surfaces of the abutment portion 402c. The positioning pins 408a and 408b are, for example, shafts parallel to the Z axis.

The abutment portions 301e of the projection optical element 360 abut the abutment portion 402c of the holder 40. An abutment portion $301e_1$ of the projection optical element 360 abuts the abutment portion $402c_1$ of the holder 40. An abutment portion $301e_2$ of the projection optical element 360 abuts the abutment portion $402c_2$ of the holder 40.

The positioning pins 408a and 408b of the holder 40 are inserted in the positioning holes 305a and 305b of the projection optical element 360, respectively. The positioning pin 408a is inserted in the positioning hole 305a. The positioning pin 408b is inserted in the positioning hole 305b.

Thereby, the positions of the projection optical element 360 in the X axis direction and Y axis direction relative to the holder 40 are determined. The positions in the X axis direction and Y axis direction are the position in a plane perpendicular to the optical axis of the projection optical element 360.

The holder 40 includes the opening 407. The opening 407 is formed in the abutment portion 402c. The abutment portion $402c_1$ is located on the +Y axis side of the opening 407. The abutment portion $402c_2$ is located on the −Y axis side of the opening 407.

The opening 407 is a hole for the light guide portion 363 of the projection optical element 360 to pass through. In FIG. 14, it is rectangular.

The holder 40 includes a hole 405a. The hole 405a is a hole for the hook portion 202a of the spring member 280 to pass through. The hole 405a is used to temporarily hold the spring member 280 in the holder 40 during, for example, assembly of the headlight 150.

The hole 405a is disposed in the abutment portion $402c_1$. The hole 405a is a hole opened perpendicular to a contact surface of the abutment portion $402c_1$. The hole 405a is, for example, a hole opened in the Z axis direction. The hole 405a is located on the +Y axis side of the leg portion 302a when the projection optical element 360 is placed in the holder 40.

Figure 15:
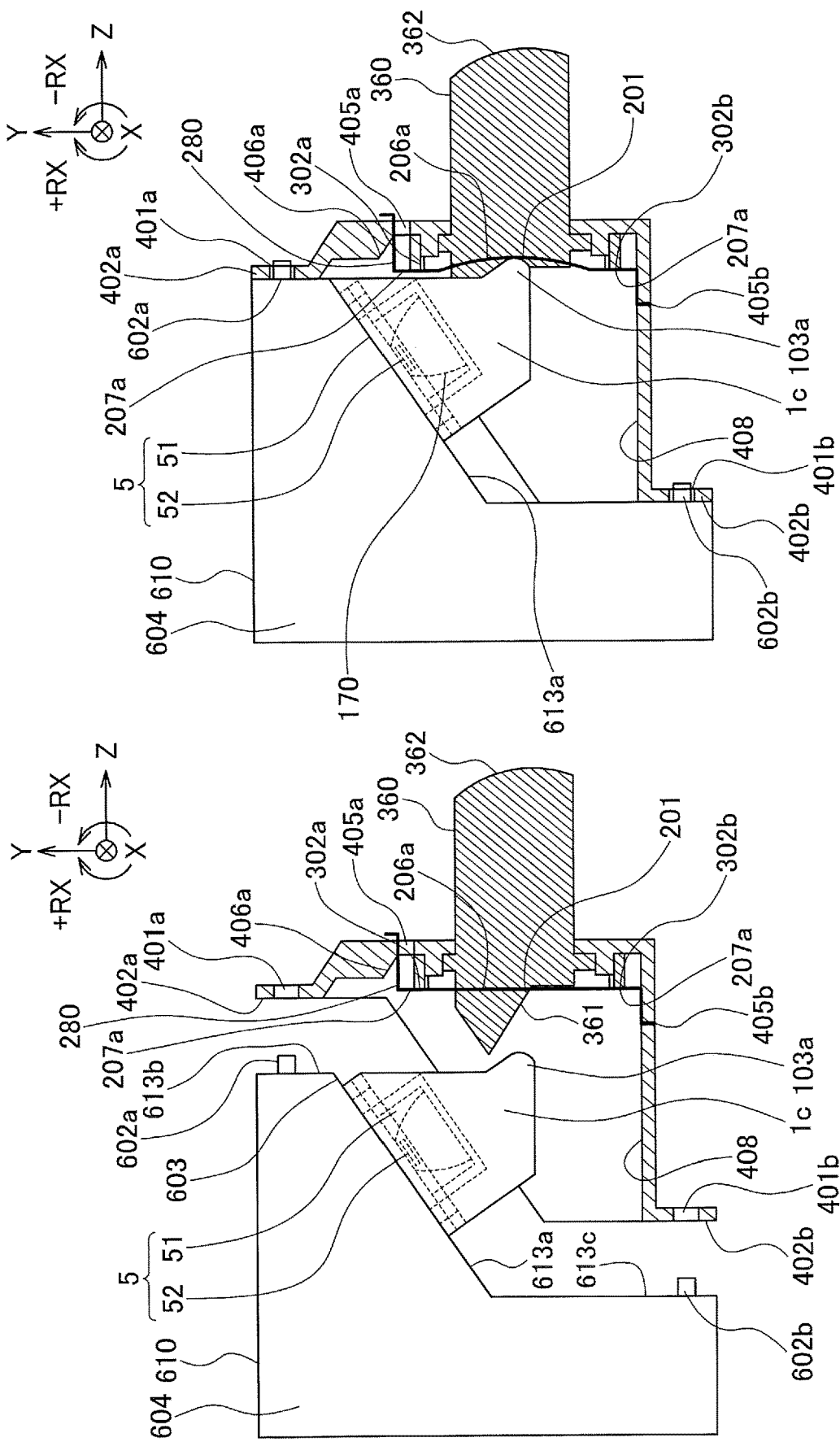
FIGS. 15A and 15B are side half sectional views of the headlight 150 explaining the illumination device according to the fifth modification example.

As illustrated in FIGS. 15A and 15B, the hole 405a has an inclined surface 406a. The inclined surface 406a is inclined in the +RX direction with respect to a Z-X plane. As the hook portion 202a is inserted into the hole 405a, the hole 405a becomes smaller.

The holder 40 includes a hole 405b. The hole 405b is a hole for the hook portion 202b of the spring member 280 to pass through. The hole 405b is used to temporarily hold the spring member 280 in the holder 40 during, for example, assembly of the headlight 150.

The hole 405b is disposed in a bottom portion 408. The hole 405b is a hole opened perpendicular to an inner surface of the bottom portion 408. The hole 405b is, for example, a hole opened in the Y axis direction.

The bottom portion 408 is, for example, a surface parallel to a Z-X plane. The bottom portion 408 is connected to an end of the abutment portion $402c_2$ on the −Y axis side. The bottom portion 408 is located on the −Z axis side of the abutment portion $402c_2$.

«Method of temporarily assembling projection optical element 360 with spring member 280»

FIGS. 15A and 15B are side sectional views for explaining a method of temporarily assembling the projection optical element 360 using the spring member FIG. 15A is a view illustrating a state where the projection optical element 360 is placed in the holder 40. FIG. 15A is a view in which the spring member 280 is mounted in the holder 40. FIG. 15B is a view illustrating a state where a light source unit 55 is mounted to the holder 40. The light source unit 55 is a unit obtained by mounting the condensing lens 1c and light emitter 5 to the heat dissipation unit 610.

The projection optical element 360 is placed into the holder 40. Then, the spring member 280 is inserted into the holder 40. The spring member 280 is inserted in the +Z direction from the −Z axis side of the holder 40.

When the hook portion 202a of the spring member 280 is inserted into the hole 405a, the hook portion 202a abuts the inclined surface 406a. As the hook portion 202a is inserted into the hole 405a, the folded portion $202a_1$ of the hook portion 202a deflects in the −Y axis direction. The hook portion 202a deforms in the −Y axis direction.

When the spring member 280 is further moved in the +Z axis direction, the tip portion $202a_2$ of the hook portion 202a passes through the hole 405a. Then, the spring member 280 returns to its original shape. The deflection of the folded portion $202a_1$ is eliminated. Then, the hook portion 202a is hooked in the hole 405a.

When the spring member 280 has returned to its original shape, the tip portion $202a_2$ of the hook portion 202a is located on the +Y axis side of the hole 405a. The tip portion $202a_2$ is located on the +Y axis side of the folded portion $202a_1$. Thus, the spring member 280 is prevented from coming off the holder 40. Thus, the projection optical element 360 is also prevented from coming off the holder 40.

When the spring member 280 is inserted into the holder 40, the hook portion 202b of the spring member 280 abuts the bottom portion 408. At this time, the folded portion $202b_1$ deflects in the +Y axis direction. The hook portion 202b deforms in the +Y axis direction.

When the spring member 280 is further moved in the +Z axis direction, the tip portion $202b_2$ of the hook portion 202b is inserted into the hole 405b. Then, the spring member 280 returns to its original shape. The deflection of the folded portion $202b_1$ is eliminated. Then, the hook portion 202b is hooked in the hole 405b.

When the spring member 280 has returned to its original shape, the tip portion $202b_2$ of the hook portion 202b is located on the −Y axis side of the inner surface of the bottom portion 408. The tip portion $202b_2$ is located on the −Y axis side of the folded portion $202b_1$. Thus, the spring member 280 is prevented from coming off the holder 40. Thus, the projection optical element 360 is also prevented from coming off the holder 40.

This temporary assembly can reduce workload during, for example, the assembly.

«Method of Fixing Projection Optical Element 360 with Spring Member 280»

The condensing lens 1c and light emitter 5 are held by the heat dissipation unit 610, for example. The light source unit 55 is a unit obtained by mounting the condensing lens 1c and light emitter 5 to the heat dissipation unit 610.

The light source unit 55 is inserted into the holder 40 in the +Z axis direction from the −Z axis side of the holder 40. At this time, the pressing portions 103 abut the flexible portions 201. The pressing portions 103 are provided in the condensing lens 1c. The flexible portions 201 are provided in the spring member 280.

As illustrated in FIGS. 15A 15B, the heat dissipation unit 610 is moved toward the holder 40 (in the +Z axis direction) until the mounting surfaces 613b and 613c of the heat dissipation unit 610 abut the abutment portions 402a and 402b of the holder 40. At this time, the pressing portions 103 press the center portions 206 of the flexible portions 201 toward the holder 40 (in the +Z axis direction). The center portions 206 are central portions of the flexible portions 201 in the Y axis direction. The center portions 206 are central portions in the long edge direction of the flexible portions 201.

The flexible portions 201 are pressed by the pressing portions 103 into convex shapes. The flexible portions 201 are bent into convex shapes projecting in the +Z axis direction. The flexible portions 201a and 201b are deflected so that the center portions 206a and 206b of the flexible portions 201a and 201b have convex shapes projecting in the +Z axis direction.

The support portions 207a and 207b are located at ends of the flexible portions 201 in the Y axis direction. The support portions 207a and 207b are located at ends in the long edge direction of the flexible portions 201. The support portions 207a and 207b abut the leg portions 302a and 302b. Thus, the flexible portions 201 deflect like a simply supported beam that is simply supported at both ends and subjected to a concentrated load at its center.

The spring member 280 has a spring property. Thus, the deformation of the flexible portions 201 into the convex shapes projecting in the +Z axis direction generates spring forces in the +Z axis direction at the ends (support portions 207) in the Y axis direction (long edge direction) of the flexible portions 201. Thus, the support portions 207a and 207b press the projection optical element 360 in the +Z axis direction.

In the configuration illustrated in FIG. 15B, the support portions 207a and 207b abut the leg portions 302a and 302b of the projection optical element 360. In FIG. 15B, the support portions 207a and 207b press the leg portions 302a and 302b of the projection optical element 360 in the +Z axis direction.

Thus, the spring forces in the +Z axis direction generated due to the deformation of the spring member 280 act as forces pressing the projection optical element 360 in the +Z axis direction.

Also, the abutment portions 301e abut the abutment portion 402c, which prevents the projection optical element 360 from moving in the +Z axis direction relative to the holder 40. Thus, the projection optical element 360 is held against the holder 4 by the spring forces in the +Z axis direction generated due to the deformation of the spring member 280.

On the other hand, due to the deformation of the flexible portions 201 such that the center portions 206 are deformed into convex shapes projecting in the +Z axis direction, the center portions 206 generate spring forces in the −Z axis direction. Thus, the center portions 206 press the condensing lens 1c in the −Z axis direction.

In the configuration illustrated in FIG. 15B, the center portions 206a and 206b abut the pressing portions 103a and 103b of the condensing lens 1c. In FIG. 15B, the center portions 206 press the pressing portions 103 of the condensing lens 1c in the −Z axis direction.

Thus, the spring forces in the −Z axis direction generated due to the deformation of the spring member 280 act as forces pressing the condensing lens 1c in the −Z axis direction.

The condensing lens 1c abuts the light emitter 5. The light emitter 5 abuts the mounting surface 613a of the heat dissipation unit 610. The mounting surfaces 603b and 603c of the heat dissipation unit 610 abut the abutment portions 402a and 402b of the holder 40. Thus, the condensing lens 1c and light emitter 5 are held against the heat dissipation unit 610 by the spring forces in the −Z axis direction generated due to the deformation of the spring member 280.

According to the fifth modification example, it is possible to hold the condensing lens 1c, projection optical element 360, and light emitter 5 with the spring forces generated due to the deformation of the spring member 280 even under an in-vehicle environment where vibration or heat is applied.

<Sixth Modification Example>

Figure 16:
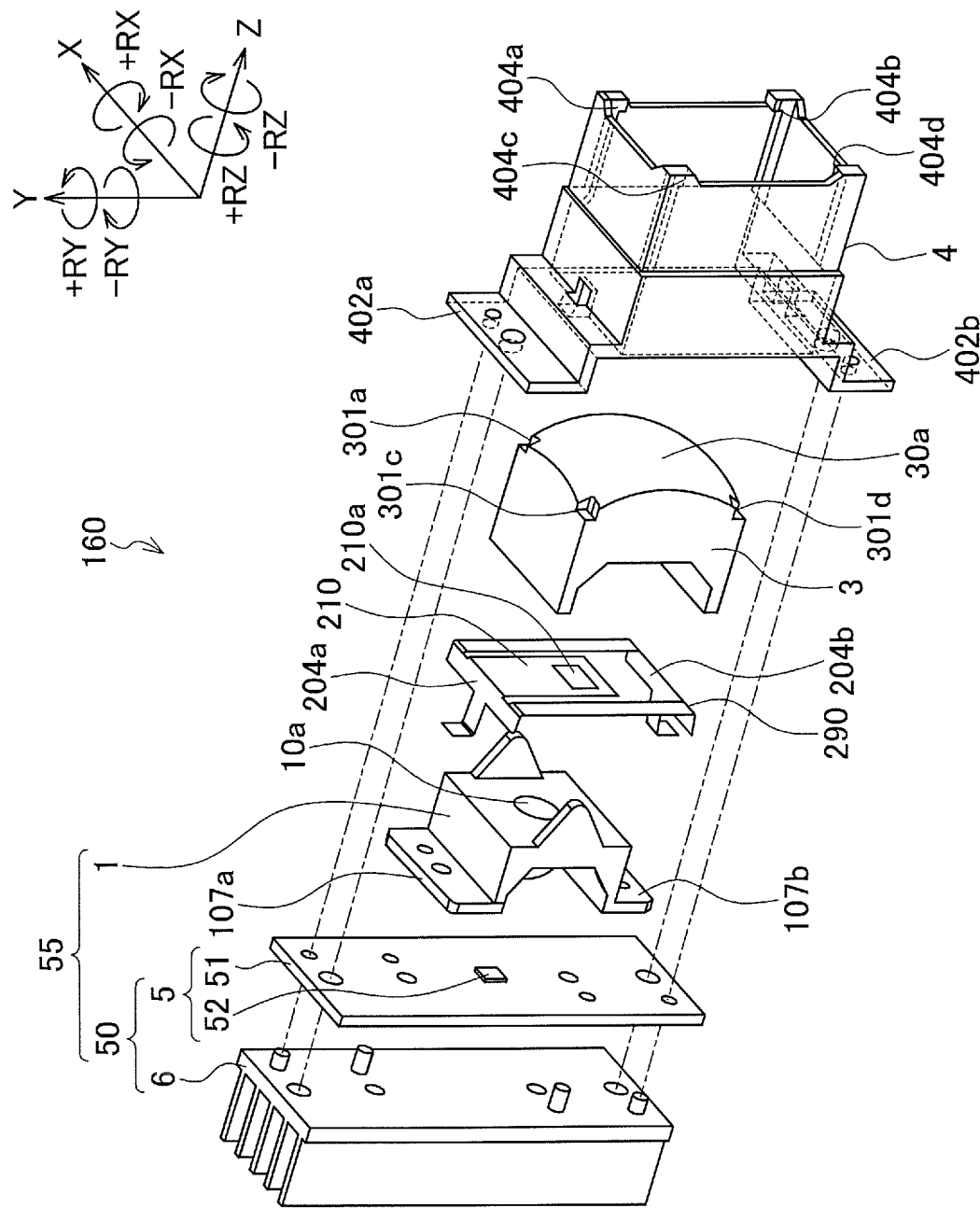
FIG. 16 is a front exploded perspective view of a headlight 160 for explaining an illumination device according to a sixth modification example.
Figure 17:
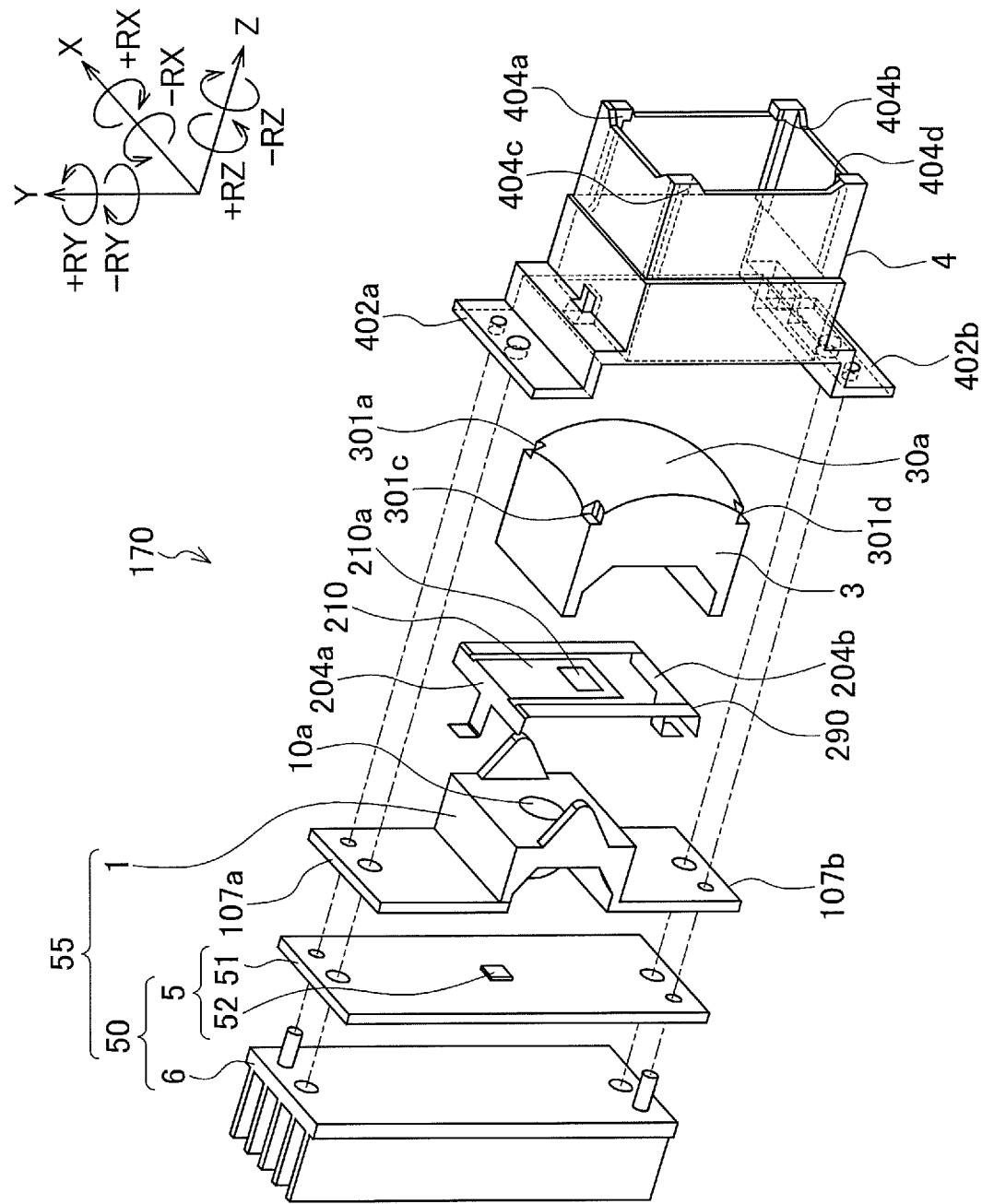
FIG. 17 is a front exploded perspective view of a headlight 170 for explaining an illumination device according to the sixth modification example.

FIGS. 16 and 17 are perspective exploded views for a sixth modification example.

«Accuracy of Position of Projection Lens 3 Relative to Condensing Lens 1»

In the headlight 100 of FIG. 1, the condensing lens 1 abuts the substrate 51. The substrate 51 abuts the heat dissipation unit 6. The heat dissipation unit 6 abuts the holder 4. The projection lens 3 abuts the holder 4.

Thus, in the positioning of the projection lens 3 relative to the condensing lens 1, dimensional tolerances of four parts are accumulated. The dimensional tolerances of the four parts are a dimensional tolerance from a lens portion 10a to the abutment portions 107 of the condensing lens 1, a thickness tolerance of the substrate 51, a dimensional tolerance from the abutment portions 402 to the abutment portions 404 of the holder 4, and a dimensional tolerance from the abutment portions 301 to a lens portion 30a of the projection lens 3. The sixth modification example improves accuracy of positioning of the projection lens 3 relative to the condensing lens 1.

The substrate 51 of FIG. 16 is larger than the substrate 51 of FIG. 1. The substrate 51 of FIG. 16 is longer in the Y axis direction than the substrate 51 of FIG. 1.

When the headlight 160 has been assembled, the substrate 51 abuts the holder 4. In FIG. 16, the surface of the substrate 51 on which the light emitting element 52 is mounted abuts the abutment portions 402 of the holder 4.

Thus, in the positioning of the projection lens 3 relative to the condensing lens 1, dimensional tolerances of three parts are accumulated. The dimensional tolerances of the three parts are a dimensional tolerance from the lens portion 10a to the abutment portions 107 (surfaces on the −Z axis side) of the condensing lens 1, a dimensional tolerance from the abutment portions 402 to the abutment portions 404 of the holder 4, and a dimensional tolerance from the abutment portions 301 to the lens portion 30a of the projection lens 3. The thickness tolerance of the substrate 51 is eliminated as compared to the headlight 100.

The abutment portions 107 of the condensing lens 1 of FIG. 17 are larger than the abutment portions 107 of the condensing lens 1 of FIG. 1. The abutment portions 107 of the condensing lens 1 of FIG. 17 are longer in the Y axis direction than the abutment portions 107 of the condensing lens 1 of FIG. 1.

When the headlight 170 has been assembled, the abutment portions 107 of the condensing lens 1 abut the holder 4. In FIG. 17, surfaces of the abutment portions 107 of the condensing lens 1 on the +Z axis side abut the abutment portions 402 of the holder 4. The +Z axis side is a side toward which the condensing lens 1 emits light.

Thus, in the positioning of the projection lens 3 relative to the condensing lens 1, dimensional tolerances of three parts are accumulated. The dimensional tolerances of the three parts are a dimensional tolerance from the lens portion 10a to the abutment portions 107 (surfaces on the +Z axis side) of the condensing lens 1, a dimensional tolerance from the abutment portions 402 to the abutment portions 404 of the holder 4, and a dimensional tolerance from the abutment portions 301 to the lens portion 30a of the projection lens 3. The thickness tolerance of the substrate 51 is eliminated as compared to the headlight 100.

Like these, by changing the portion of the light source unit 55 that abuts the holder 4, it is possible to improve accuracy of the position of the projection lens 3 relative to the condensing lens 1. 210.

«Light blocking plate 210»

The spring member 290 described in the sixth modification example is provided with a light blocking plate 210.

The light blocking plate 210 blocks part of the light emitted from the condensing lens 1. The light blocking plate 210 thus forms a light distribution pattern (first light distribution pattern), for example. The light blocking plate 210 forms a cutoff line, for example.

In FIGS. 16 and 17, the light blocking plate 210 is connected to the connecting portion 204a of the spring member 290. The light blocking plate 210 is connected to an end of the connecting portion 204a on the +Z axis side.

The light blocking plate 210 is provided with an opening 210a. For example, it is possible to form the shape of a rising line with the shape of the opening 210a. The rising line is used in a passing headlight (low beam). The light distribution pattern of a passing headlight has, for example, a cutoff line bent to rise to the left in left-hand traffic countries, such as Japan.

Like this, by providing the spring member 290 with the light blocking plate 210, it is possible to easily form a light distribution pattern (first light distribution pattern).

Although each embodiment described above describes an example in which it is used for a headlight, the present invention is not limited to this.

Each embodiment described above may use terms, such as "parallel" or "perpendicular", indicating the positional relationships between parts or the shapes of parts. These terms include ranges taking account of manufacturing tolerances, assembly variations, or the like. Thus, recitations in the claims indicating the positional relationships between parts or the shapes of parts include ranges taking account of manufacturing tolerances, assembly variations, or the like.

In the above-described embodiments and modification examples, the flexible portions 201, which are originally straight, are bent by the pressing portions 103 or 351. However, the flexible portions 201 may be originally bent and made straight by the pressing portions 103 or 351. In both cases, the flexible portions 201 can generate spring force.

Although the embodiments of the present invention have been described as above, the present invention is not limited to these embodiments.

Based on the above embodiments, contents of the invention will be described below as Appendixes (1) and (2). In Appendixes (1) and (2), numbering is made independently. Thus, for example, Appendixes (1) and (2) each include "Appendix 1."

It is possible to combine features in Appendix (1) and features in Appendix (2).

<Appendix (1)>
<Appendix 1>

An optical element holding structure comprising:
a light source that emits light;
a first optical element that transmits the light;
a second optical element that transmits the light transmitted by the first optical element;
a holder that holds the light source, the first optical element, and the second optical element; and
a spring member that presses the second optical element against the holder and presses the first optical element against the light source, wherein
the spring member includes flexible portions having elongated shapes; and
the second optical element abuts both ends of each of the flexible portions, the first optical element abuts a center portion of each of the flexible portions from a side opposite to the second optical element, and the flexible portions deflect when the light source is held by the holder.

<Appendix 2>
The optical element holding structure of Appendix 1, wherein the flexible portions are disposed to sandwich an optical axis of the first optical element and an optical axis of the second optical element.

<Appendix 3>
The optical element holding structure of Appendix 2, wherein
a dimension of the first optical element in a direction perpendicular to the optical axis of the first optical element is a first dimension, and a dimension of the second optical element in a direction perpendicular to the optical axis of the second optical element is a second dimension; and
the flexible portions are disposed so that a direction in which the flexible portions are elongated is directed in a direction in which the second dimension is greater than the first dimension.

<Appendix 4>
The optical element holding structure of any one of Appendixes 1 to 3, wherein the first optical element is a condensing lens, and the second optical element is a projection lens.

<Appendix (2)>
<Appendix 1>

An illumination device comprising:
a light source including a light emitting element that emits light;
a first optical element that transmits the light;
a second optical element that transmits the light transmitted by the first optical element;
a holder that holds the second optical element; and
a spring member including at least one spring portion that generates a spring force by being deflected, the spring member pressing the second optical element against the holder with the spring force to hold the second optical element against the holder,
wherein the first optical element and the second optical element deflect a center portion in a long edge direction of the at least one spring portion with respect to both ends in the long edge direction of the at least one spring portion.

<Appendix 2>
The illumination device of Appendix 1, wherein
the first optical element includes a pressing portion that abuts the center portion in the long edge direction of the at least one spring portion;
the second optical element includes, at ends in a radial direction of the second optical element, supporting portions that support the ends in the long edge direction of the at least one spring portion; and
the pressing portion presses the center portion toward the second optical element to deflect the at least one spring portion with respect to the ends in the long edge direction of the at least one spring portion.

<Appendix 3>
The illumination device of Appendix 1, wherein
the first optical element includes, at ends in a radial direction of the first optical element, supporting portions that support the ends in the long edge direction of the at least one spring portion;
the second optical element includes a pressing portion that abuts the center portion in the long edge direction of the at least one spring portion; and
the supporting portions press the ends in the long edge direction of the at least one spring portion toward the second optical element to deflect the at least one spring portion with respect to the center portion in the long edge direction of the at least one spring portion.

<Appendix 4>
The illumination device of Appendix 2 or 3, wherein the ends in the long edge direction of the at least one spring portion are supported to be rotatable relative to the supporting portions in accordance with deflection of the at least one spring portion.

<Appendix 5>
The illumination device of any one of Appendixes 2 to 4, wherein the ends in the long edge direction of the at least one spring portion are supported to be movable in a longitudinal direction of the at least one spring portion relative to the supporting portions in accordance with deflection of the at least one spring portion.

<Appendix 6>
The illumination device of any one of Appendixes 1 to 5, wherein the at least one spring portion is disposed away from an inner surface of the holder.
<Appendix 7>
The illumination device of any one of Appendixes 1 to 6, wherein the at least one spring portion has a plate shape.
<Appendix 8>
The illumination device of any one of Appendixes 1 to 7, wherein the at least one spring portion comprises two spring portions;

the spring member further includes two connecting portions that connect the ends of the two spring portions;

the two spring portions are disposed to face each other with an optical axis of the second optical element between the two spring portions; and the two connecting portions are disposed to face each other with the optical axis of the second optical element between the two connecting portions.
<Appendix 9>
The illumination device of Appendix 8, wherein the connecting portions include a first hook portion for hooking the spring member to the holder.
<Appendix 10>
The illumination device of Appendix 8, wherein the spring member is movable in an optical axis direction of the second optical element relative to the holder.
<Appendix 11>
The illumination device of Appendix 9 or 10, wherein the spring member is held by the holder through the first hook portion.
<Appendix 12>
The illumination device of Appendix 11, wherein with the holding through the first hook portion, the spring portions are disposed away from an inner surface of the holder.
<Appendix 13>
The illumination device of any one of Appendixes 8 to 12, wherein the connecting portions include a second hook portion for hooking the spring member to the first optical element.
<Appendix 14>
The illumination device of Appendix 13, wherein the spring member is movable in an optical axis direction of the first optical element relative to the first optical element.
<Appendix 15>
The illumination device of Appendix 13 or 14, wherein the spring member is held by the first optical element through the second hook portion.
<Appendix 16>
The illumination device of Appendix 15, wherein with the holding through the second hook portion, the spring portions are disposed away from an inner surface of the holder.
<Appendix 17>
The illumination device of any one of Appendixes 8 to 16, wherein the connecting portions include a third hook portion for hooking the spring member to the second optical element.
<Appendix 18>
The illumination device of Appendix 17, wherein the spring member is movable in an optical axis direction of the second optical element relative to the second optical element.
<Appendix 19>
The illumination device of Appendix 17 or 18, wherein the spring member is held by the second optical element through the third hook portion.

<Appendix 20>
The illumination device of Appendix 19, wherein with the holding through the third hook portion, the spring portions are disposed away from an inner surface of the holder.
<Appendix 21>
The illumination device of any one of Appendixes 1 to 20, wherein the first optical element is a condensing lens that concentrates the light emitted by the light emitting element.
<Appendix 22>
The illumination device of any one of Appendixes 1 to 21, wherein the second optical element is a projection lens that projects light transmitted by the first optical element.
<Appendix 23>
The illumination device of Appendix 22, wherein the connecting portions include a light blocking plate that blocks light transmitted by the first optical element;

the second optical element projects a light distribution pattern formed by the light blocking plate.
<Appendix 24>
The illumination device of any one of Appendixes 1 to 21, wherein the second optical element is a projection optical element that projects light transmitted by the first optical element.
<Appendix 25>
The illumination device of Appendix 24, wherein the second optical element includes a reflecting surface that reflects the light incident on the second optical element, and an emitting surface that emits light reflected by the reflecting surface; and the emitting surface projects a light distribution pattern formed by the reflecting surface.
<Appendix 26>
The illumination device of Appendix 8, wherein the connecting portions include a light blocking plate that blocks light transmitted by the first optical element;
<Appendix 27>
The illumination device of any one of Appendixes 1 to 26, wherein the first optical element is positioned relative to the light source; and the light source is positioned relative to the holder.
<Appendix 28>
The illumination device of Appendix 27, wherein the light source includes a heat dissipation unit; and the heat dissipation unit is positioned relative to the holder.
<Appendix 29>
The illumination device of any one of Appendixes 1 to 26, wherein the first optical element is positioned relative to the holder.
<Appendix 30>
An illumination apparatus used in a vehicle, comprising an illumination device of any one of Appendixes 1 to 29.
<Appendix 31
A headlight comprising an illumination device of any one of Appendixes 1 to 29.

REFERENCE SIGNS LIST 100, 110, 120, 130, 140, 150 headlight, 1, 1a, 1b, 1c condensing lens, 10a lens portion, 101 refracting portion, 102 reflecting portion, 103a, 103b pressing portion, 104a, 104b positioning hole, 105, 105a, 105b projection, 106, 106a, 106b inclined surface, 107, 107a, 107b abutment portion, 161a, 161b leg portion, 2, 230, 250, 270, 280, 290 spring member, 201, 201a, 201b flexible portion, 202a, 202b hook portion, 202a$_1$, 202b$_1$ folded portion, 202a$_2$, 202b$_2$ tip portion, 203a, 203b, 209a, 209b holding hole, 204, 204a, 204b connecting portion, 205, 205a, 205b, 208, 208a, 208b holding portion, 206, 206a, 206b center portion, 207, 207a, 207b support portion, 210 light blocking plate, 210a opening, 3, 330, 350 projection lens, 30a lens portion, 301a, 301b, 301c, 301d, 301e abutment portion, 302a, 302b leg portion, 303, 303a, 303b projection, 304, 304a, 304b inclined surface, 351 abutment portion, 360 projection optical element, 361 reflecting surface, 362 emitting surface, 363 light guide portion, 4, 40 holder, 401a, 401b positioning hole, 402a, 402b, 402c, 402$c_1$, 402$c_2$ abutment portion, 403a, 403b, 403c, 403d guide surface, 404a, 404b, 404c, 404d abutment portion, 405a, 405b hole, 406a, 406b inclined surface, 407 opening, 408 bottom portion, 5 light emitting portion, 50 light source, 51 substrate, 52 light emitting element, 55 light source unit, 501a, 501b positioning hole, 6, 610 heat dissipation unit, 601a, 601b, 602a, 602b positioning pin, 603, 613a, 613b, 613c mounting surface, 604 fin.

The invention claimed is:

1. An illumination device comprising:
a light source including a light emitting element that emits light;
a first optical element that transmits the light;
a second optical element that transmits the light transmitted by the first optical element;
a holder that holds the second optical element; and
a spring member including at least one spring portion that generates spring force by being deflected, the spring member pressing the second optical element against the holder with the spring force to hold the second optical element against the holder,
wherein the first optical element and the second optical element deflect a center portion in a long edge direction of the at least one spring portion with respect to ends in the long edge direction of the at least one spring portion.

2. The illumination device of claim 1, wherein
the first optical element includes a pressing portion that abuts the center portion in the long edge direction of the at, least one spring portion;
the second optical element includes, at ends in a radial direction of the second optical element, supporting portions that support the ends in the long edge direction of the at least of spring portion; and
the pressing portion presses the center portion toward the second optical element deflect the at least one spring portion with respect to the ends in the long edge direction of the at least one spring portion.

3. The illumination device of claim I. wherein
the first optical element includes, at ends in a radial direction of the first optical element, supporting portions that support the ends in the long edge direction of the at least one spring portion;
the second optical element includes a pressing portion that abuts the center portion in the long edge direction of the at least one spring portion; and
the supporting portions press the ends in the long edge direction of the at least one spring portion toward the second optical element to deflect the at least one spring portion with respect to the center portion in the long edge direction of the at least one spring portion.

4. The illumination device of claim 2, wherein the ends in the long edge direction of the at least one spring portion are supported to be rotatable relative to the supporting portions in accordance with deflection of the at least one spring portion.

5. The illumination device of claim 2, wherein the ends in the long edge direction of the at least one spring portion are supported to be movable in a longitudinal direction of the at least one spring portion relative to the supporting portions in accordance with deflection of the at least one spring portion.

6. The illumination device of claim 1, wherein
the at least one spring portion comprises two spring portions;
the spring member further includes two connecting portions that connect the ends of the two spring portions;
the two spring portions are disposed to face each other with an optical axis of the second optical element between the two spring portions; and
the two connecting portions are disposed to face each other with the optical axis of the second optical element between the two connecting portions.

7. The illumination device of claim 6, wherein the connecting portions include a hook portion for hooking the spring member to the holder.

8. The illumination device of claim 7, wherein spring member is held by tine holder through the hook portion.

9. The illumination device of claim 8, therein with the holding through the hook portion, the spring portions are disposed away from an inner surface of the holder.

10. The illumination device of claim 1, wherein
the first optical element is positioned relative to the light source; and
the light source is positioned relative to the holder.

11. The illumination device of claim 3, wherein the ends in the long edge direction of the at least one spring portion are supported to be rotatable relative to the supporting portions in accordance with deflection of the at least one spring portion.

12. The illumination device of claim 3, wherein the ends in the long edge direction of the at least one spring portion are supported to be movable in a longitudinal direction of the at least one spring portion relative to the supporting portions in accordance with deflection of the at least one spring portion.

13. The illumination device of claim 4, wherein the ends in the long edge direction of the at least one spring portion are supported to be movable in a longitudinal direction of the at least one spring portion relative to the supporting portions in accordance with deflection of the at least one spring portion.

14. The illumination device of claim 11, wherein the ends in the long edge direction of the at least one spring portion are supported to be movable in a longitudinal direction of the at least one spring portion relative to the supporting portions in accordance with deflection of the at least one spring portion.

15. The illumination device of claim 2, wherein
the at least one spring portion comprises two spring portions;
the spring member further include two connecting portions that connect the end of the two spring portions;
the two spring portions are disposed to face each other with an optical axis of the second optical element between the two spring portions; and
the two connecting portions are disposed to face each other h the optical axis of the second optical element between the two connecting portions.

16. The illumination device of claim 3, wherein
the at least one spring portion comprises two spring portions;
the spring member further includes two connecting portions that connect the ends of two spring portions;

the two spring portions are disposed to face each other with an optical axis of second optical element between the two spring portions; and the two connecting portions are disposed to face each other with the optical axis of the second optical element between the two connecting portions.

17. The illumination device of claim 4, wherein the at least one spring portion comprises two spring portions;

the spring member further includes two connecting portions that connect the ends of the two spring portions;

the two spring portions are disposed to face each other with an optical axis of the second optical element between the two spring portions; and the two connecting portions are disposed to face each other with the optical axis second optical element between the two connecting portions.

18. The illumination device of claim 5, wherein the at least one spring portion comprises two spring portions;

the spring member further includes two connecting portions that connect the ends of the two spring portions;

the two spring portions are disposed to face each other with an optical axis of the second optical element between the two spring portions; and the two connecting portions are disposed to face each other with the optical axis of the second optical element between the two connecting portions.

19. The illumination device of claim 11, herein the at least one spring portion comprises two spring portion;

the spring member further includes two connecting portions that connect the ends of the two spring portions;

the two spring portions are disposed to face each other with an optical axis of the second optical element between the two spring portions; and the two connecting portions are disposed to face each other with the optical axis of the second optical element between the two connection portions.

20. The illumination device of claim 12, wherein the at least one spring portion comprises two spring portions;

the spring member further includes two connecting portions that connect the ends of the two spring portions;

two spring portions are disposed to face each other with an optical axis of the second optical element between the two spring portions; and the two connecting portions are disposed to face each other with the optical axis of the second optical element between the two connecting portions.

\* \* \* \* \*